(12) United States Patent
Hashemi et al.

(10) Patent No.: US 10,259,104 B2
(45) Date of Patent: Apr. 16, 2019

(54) PRECISION CLAMP

(71) Applicant: NIKON CORPORATION, Tokyo (JP)

(72) Inventors: Fardad A. Hashemi, Moraga, CA (US); Travis D. Bow, East Palo Alto, CA (US); Patrick Chang, San Mateo, CA (US)

(73) Assignee: NIKON CORPORATION (JP)

( * ) Notice: Subject to any disclaimer, the term of this patent is extended or adjusted under 35 U.S.C. 154(b) by 33 days.

(21) Appl. No.: 14/526,326

(22) Filed: Oct. 28, 2014

(65) Prior Publication Data

US 2015/0115513 A1 Apr. 30, 2015

Related U.S. Application Data

(60) Provisional application No. 61/955,959, filed on Mar. 20, 2014, provisional application No. 61/896,479, filed on Oct. 28, 2013.

(51) Int. Cl.
| | |
|---|---|
| *B23B 31/10* | (2006.01) |
| *B23B 31/28* | (2006.01) |
| *B25B 5/06* | (2006.01) |
| *B25B 5/16* | (2006.01) |

(52) U.S. Cl.
CPC .............. *B25B 5/16* (2013.01); *B23B 31/10* (2013.01); *B23B 31/28* (2013.01); *B25B 5/06* (2013.01)

(58) Field of Classification Search
CPC ......... B25B 11/005; B25B 5/06; B25B 5/061; B23B 31/28
USPC ............... 269/20, 22; 279/3, 4.06, 2.06–2.09
See application file for complete search history.

(56) References Cited

U.S. PATENT DOCUMENTS

| | | | | |
|---|---|---|---|---|
| 1,390,627 A | * | 9/1921 | Lindahl | C03B 23/13 269/21 |
| 1,616,188 A | * | 2/1927 | Hatcher | B25B 11/005 269/21 |
| 2,534,527 A | * | 12/1950 | Myers | B23B 31/1223 24/463 |
| 2,801,858 A | * | 8/1957 | Spieth | B23B 31/1177 279/2.17 |
| 3,025,072 A | * | 3/1962 | Cahill | B25B 5/065 242/571.1 |
| 3,079,102 A | * | 2/1963 | Douglas | B65H 75/242 242/573 |
| 3,147,017 A | * | 9/1964 | Dunham | B23B 31/307 248/362 |
| 3,236,533 A | * | 2/1966 | Mullion | B25B 11/005 279/3 |

(Continued)

FOREIGN PATENT DOCUMENTS

WO  WO2010036546 A1  4/2010

*Primary Examiner* — Tyrone V Hall, Jr.
(74) *Attorney, Agent, or Firm* — Roeder & Broder LLP; Steven G. Roeder

(57) ABSTRACT

A clamp for selectively inhibiting movement of a first object relative to a second object includes (i) a first clamp component coupled to the first object; (ii) a second clamp component coupled to the second object; and (iii) a fluid source that directs a fluid to the second clamp component to create a fluid bearing between the first clamp component and the second clamp component that allows for movement of the first clamp component relative to the second clamp component, and wherein the fluid source directs less fluid to the second clamp component to inhibit relative movement.

27 Claims, 20 Drawing Sheets

(56) References Cited

U.S. PATENT DOCUMENTS

| | | | | |
|---|---|---|---|---|
| 3,507,507 A * | 4/1970 | Cochon | B23B 31/305 | 279/2.08 |
| 3,542,354 A * | 11/1970 | Fitzpatrick | B23B 31/305 | 269/22 |
| 3,626,506 A * | 12/1971 | Spieth | F16B 21/10 | 279/2.01 |
| 3,995,534 A * | 12/1976 | Rastetter | B66B 5/028 | 188/170 |
| 4,422,653 A * | 12/1983 | Piotrowski | B23B 31/204 | 279/2.03 |
| 4,846,483 A * | 7/1989 | Sorensen | B41F 17/28 | 101/40 |
| 5,308,132 A * | 5/1994 | Kirby | B25J 9/1633 | 29/743 |
| 5,370,337 A * | 12/1994 | Pratt | B65H 75/243 | 242/571.1 |
| 5,989,444 A * | 11/1999 | Zywno | B25B 11/005 | 216/33 |
| 6,302,364 B1 * | 10/2001 | Chiueh | B60N 3/10 | 206/545 |
| 6,328,362 B1 * | 12/2001 | Isogai | H05K 13/0408 | 29/740 |
| 7,392,886 B2 * | 7/2008 | Hofmann | B23Q 1/287 | 188/151 R |
| 7,543,867 B2 * | 6/2009 | Pun | B65G 49/061 | 279/3 |
| 7,861,830 B2 * | 1/2011 | Hofmann | F15B 15/262 | 188/151 R |
| 7,963,717 B2 * | 6/2011 | Seger | F16B 21/165 | 279/50 |
| 8,123,233 B2 * | 2/2012 | Hofmann | B23B 31/107 | 279/4.01 |
| 9,409,414 B2 * | 8/2016 | Miller | B41J 3/4073 | |
| 2004/0262855 A1 * | 12/2004 | Andre, Sr. | B23B 31/305 | 279/2.08 |
| 2005/0089645 A1 * | 4/2005 | Keigler | C25D 21/12 | 427/443.1 |
| 2013/0188895 A1 | 7/2013 | Devitt | | |

\* cited by examiner

PRECISION CLAMP

CROSS-REFERENCE TO RELATED APPLICATION

This application claims priority on U.S. Provisional Application Ser. No. 61/896,479 filed on Oct. 28, 2013 and entitled "PRECISION CLAMP". This application also claims priority on U.S. Provisional Application Ser. No. 61/955,959 filed on Mar. 20, 2014 and entitled "PRECISION CLAMP". As far as is permitted, the contents of U.S. Provisional Application Ser. No. 61/896,479, and the contents of U.S. Provisional Application Ser. No. 61/955,959 are incorporated herein by reference.

BACKGROUND

Often it is desirable to apply a clamp to hold an object in position. For example, for an exposure apparatus, it is often desirable to hold a stage and its load in position. For example, when a current stage position needs to be held for a while, the stage can be clamped to save power and inhibit the stage movers from heating up. Also, for systems that combine a low-stiffness long-range coarse stage in series with a high-stiffness short-range fine stage, the coarse stage can be clamped in between long range travels to increase the stiffness of the overall system while the stiffer fine stage accommodates short-range motion.

Unfortunately, the forces and stresses from the clamping action of a clamp can cause deformations and motions that are too large for maintaining position within nano-scale tolerances.

SUMMARY

In certain embodiments, the present invention is directed to a clamp for selectively inhibiting movement of first object relative to a second object. In one embodiment, the clamp includes (i) a first clamp component coupled to the first object; (ii) a second clamp component coupled to the second object; and (iii) a fluid source that directs a fluid to the second clamp component to create a fluid bearing between the first clamp component and the second clamp component that allows for movement of the first clamp component relative to the second clamp component, and wherein the fluid source directs less fluid to the second clamp component to inhibit relative movement.

In certain embodiments, the first clamp component is biased to move against the second clamp component. For example, the first clamp component can be a radially deformable shaft. Further, the first clamp component can be deformed in the unclamped configuration.

In certain embodiments, the clamps provided herein minimize deformations and motions in the following ways: clamping loads are symmetrical and perpendicular to the axes being clamped. Further, clamping loads change very little when switching between the clamped and unclamped states. Moreover, the clamps exert a clamping force gradually and uniformly.

Moreover, the present invention is directed to one or more methods for clamping a first object to a second object.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 10E, 10F, 100 illustrate three alternative embodiments of the clamp assembly;

DESCRIPTION

Figure 1A:
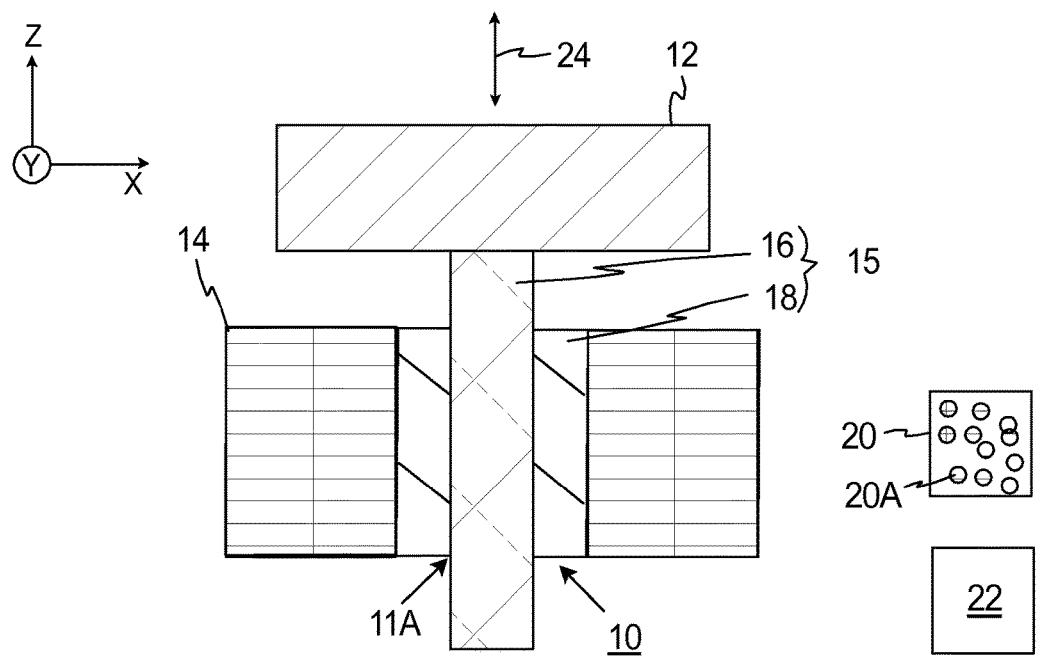
FIG. 1A is a simplified cutaway view of a clamp in clamped configuration.
Figure 1B:
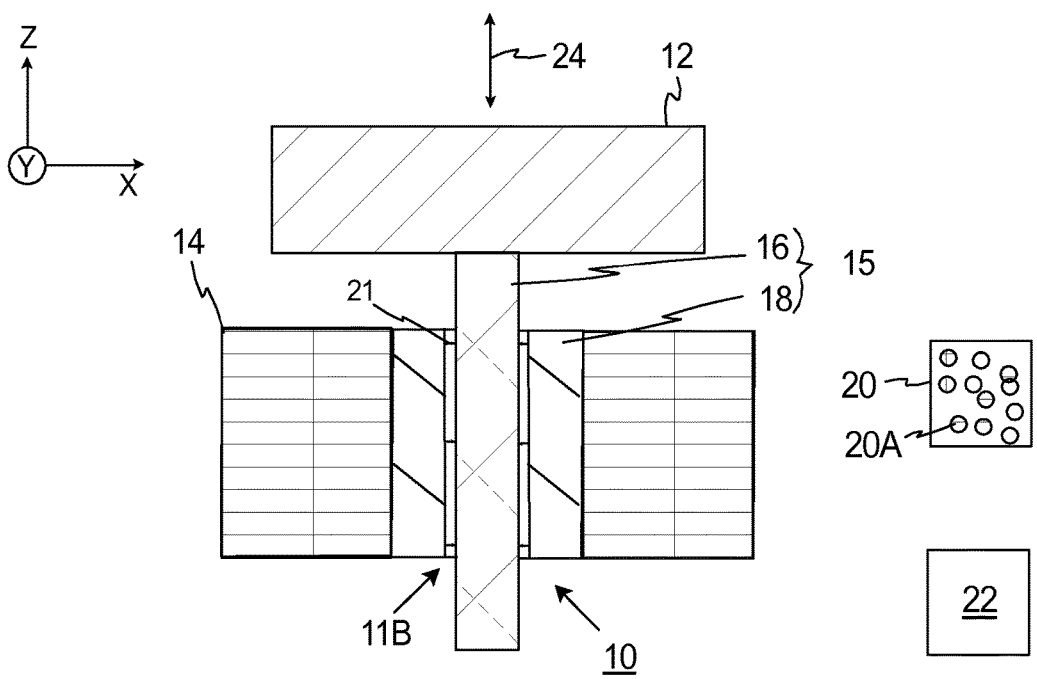
FIG. 1B is a simplified cutaway view of the clamp of FIG. 1A in an unclamped configuration.

FIG. 1A is a simplified cutaway view of a clamp 10 in a clamped configuration 11A and FIG. 1B is a simplified cutaway view of the clamp 10 in an unclamped configuration 11B. In one embodiment, as provided herein, the clamp 10 that can be controlled to selectively inhibit (in the clamped configuration 11A) or allow for (in the unclamped configuration 11B) relative movement between a first object 12 and a fixed, second object 14. In one embodiment, the clamp 10 includes (i) a clamp assembly 15 having a first clamp component 16 that is coupled and fixedly secured to the first object 12, and a second clamp component 18 that is coupled and fixedly secured the second object 14, (ii) a fluid source 20 (illustrated as a box) that selectively directs a fluid 20A (illustrated as small circles) to one or both of the clamp components 16, 18, (iv) and a control system 22 (illustrated as a box) that controls the fluid source 20. The design of each of these components can be varied pursuant to the teachings provided herein.

A number of Figures include an orientation system that illustrates an X axis, a Y axis that is orthogonal to the X axis, and a Z axis that is orthogonal to the X and Y axes. It should be understood that the orientation system is merely for reference and can be varied. For example, the X axis can be switched with the Y axis and/or the Z axis. Moreover, it should be noted that any of these axes can also be referred to as the first, second, and/or third axes.

As an overview, the clamp assembly 15 is selectively movable between the clamped configuration 11A in which relative movement of the clamp components 16, 18 is inhibited and the unclamped configuration 11B that allows for relative movement between the clamp components 16, 18. Further, the fluid source 20 selectively directs the fluid 20A to the clamp assembly 15 to selectively create a fluid bearing 21 (illustrated as small arrows in FIG. 1B) that moves the clamp assembly 15 from the clamped configuration 11A to the unclamped configuration 11B. More specifically, for the non-exclusive embodiment illustrated in FIGS. 1A and 1B, the fluid source 20 selectively directs the fluid 20A to the second clamp component 18 at a sufficient flow and pressure to selectively create the fluid bearing 21 that deforms the first clamp component 16 to allow for relative movement between the clamp components 16, 18. Alternatively, the clamp assembly 15 can be designed so that fluid bearing 21 significantly deforms the second clamp component 18.

It should be noted that the size of the fluid bearing 21 and the deformation of the first clamp component 16 is exaggerated in this example for clarity. In this embodiment, and some other designs of the clamp assemblies provided herein, the fluid bearing 21 when on allows for smooth movement and when off the clamp assembly inhibits motion. Because the fluid bearing 21 is relatively small, the gap between the components 16, 18 is small, and there is very little change in the forces and stresses on, and shape (diameter) of the first clamp component 16 between the clamped configuration 11A and the unclamped configuration 11B. As a result thereof, there is very little change in forces on the first object 12 that result from the unclamped configuration 11B or the clamped configuration 11A of the first clamp component 16. As non-exclusive examples, in certain embodiments, the change in forces and stresses on the first clamp component 16 between the clamped configuration 11A and the unclamped configuration 11B is less than approximately 0.5, 1, 2, 3, 4, 5, 6, 7, 8, 9, 10, 15 or 20 percent.

In certain embodiments, the clamp 10 is designed to selectively inhibit relative motion between the clamp components 16, 18 along a single movement axis 24 (e.g. the Z axis in this example), and in turn selectively inhibit relative motion between the objects 12, 14 along the single movement axis 24 (e.g. the Z axis in this example). The clamps 10 provided in certain embodiments reduce and minimize deformation in the objects 12, 14 caused by clamping because the clamping loads are symmetrical and perpendicular to the axes being clamped. Further, clamping loads change very little when switching between the clamped configuration 11A and unclamped configuration 11B.

It should be noted that additional clamps 10 (not shown in FIG. 1A can be used to inhibit relative movement along or about the other axes.

The clamps 10 provided herein can be used in a wide variety of applications. For example, one or more of the clamps 10 can be used to hold an object in position. For example, for an exposure apparatus, it is often desirable to hold a stage and its load in position to save power and inhibit the stage movers from heating up. Also, one or more of the clamps 10 can be used for systems that combine a low-stiffness long-range coarse stage in series with a high-stiffness short-range fine stage, to clamp the coarse stage in between long range travels to increase the stiffness of the overall system while the stiffer fine stage accommodates short-range motion.

However, the clamps 10 can be used in other applications, such as holding workpieces in an aligned position during a manufacturing or other process.

The fluid source 20 can be a source of pressurized air or another fluid or a vacuum source. In FIG. 1A the fluid source 20 selectively directs the pressurized fluid 20A to the second clamp component 18 at a sufficient pressure and flow to unclamp the clamp components 16, 18 and allow for relative movement up and down along the movement axis 24, and stops directing (or reduces the pressure and/or flow of) the pressurized fluid 20A to the second clamp component 18 to clamp the clamp components 16, 18 and inhibit relative movement along the movement axis 24.

The control system 22 controls the flow of fluid 20A to the second clamp component 18. For example, the control system 22 can include one or more processors and circuits.

Figure 2A:
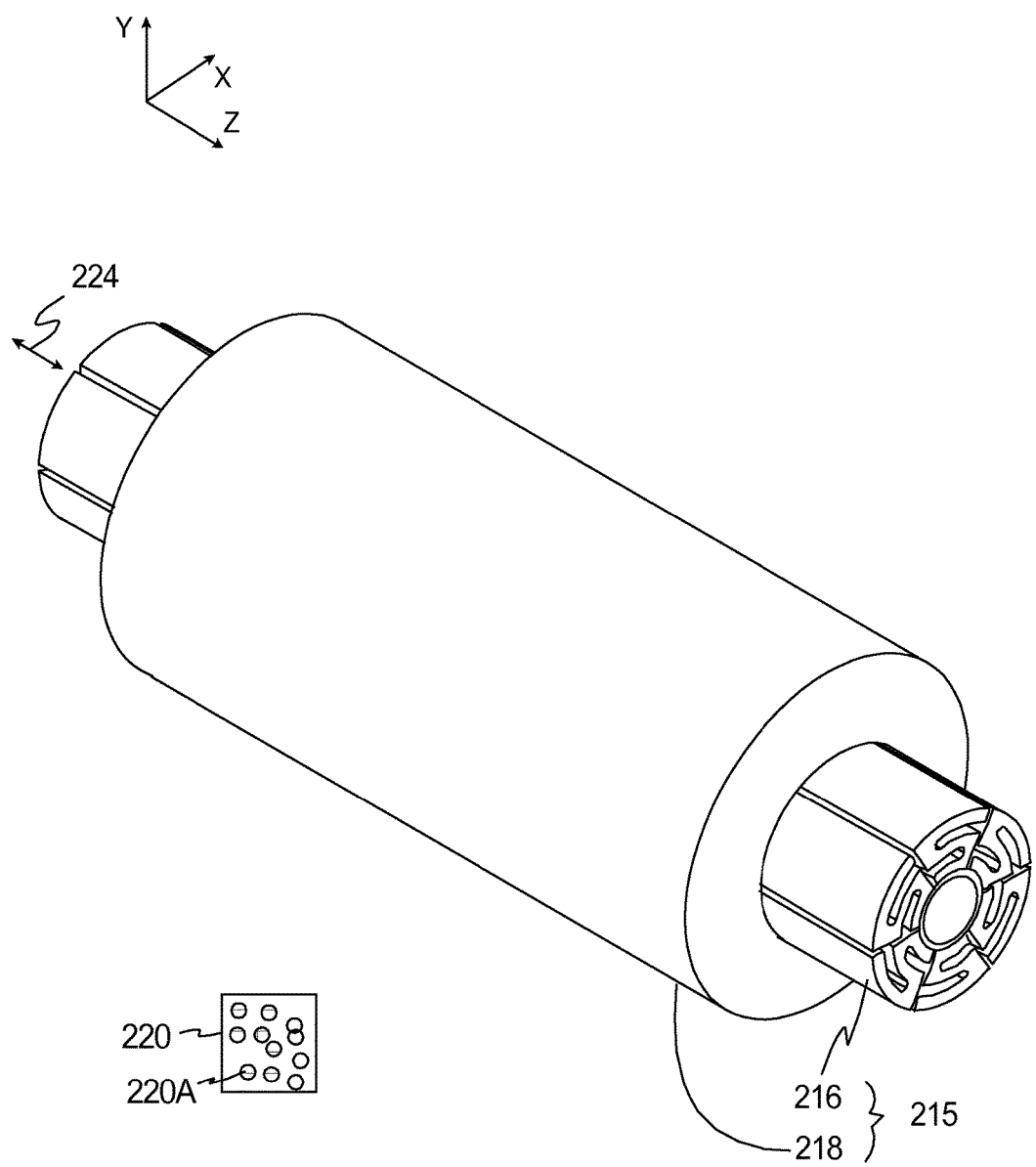
FIG. 2A is a perspective view of another embodiment of a clamp.

FIG. 2A is a perspective view of another embodiment of the clamp assembly 215 including the first clamp component 216 and the second clamp component 218. The movement axis 224 is also illustrated in FIG. 2A. Further, FIG. 2B is a perspective view of the first clamp component 216 and FIG. 2C is a perspective view of the second clamp component 218.

Figure 2B:
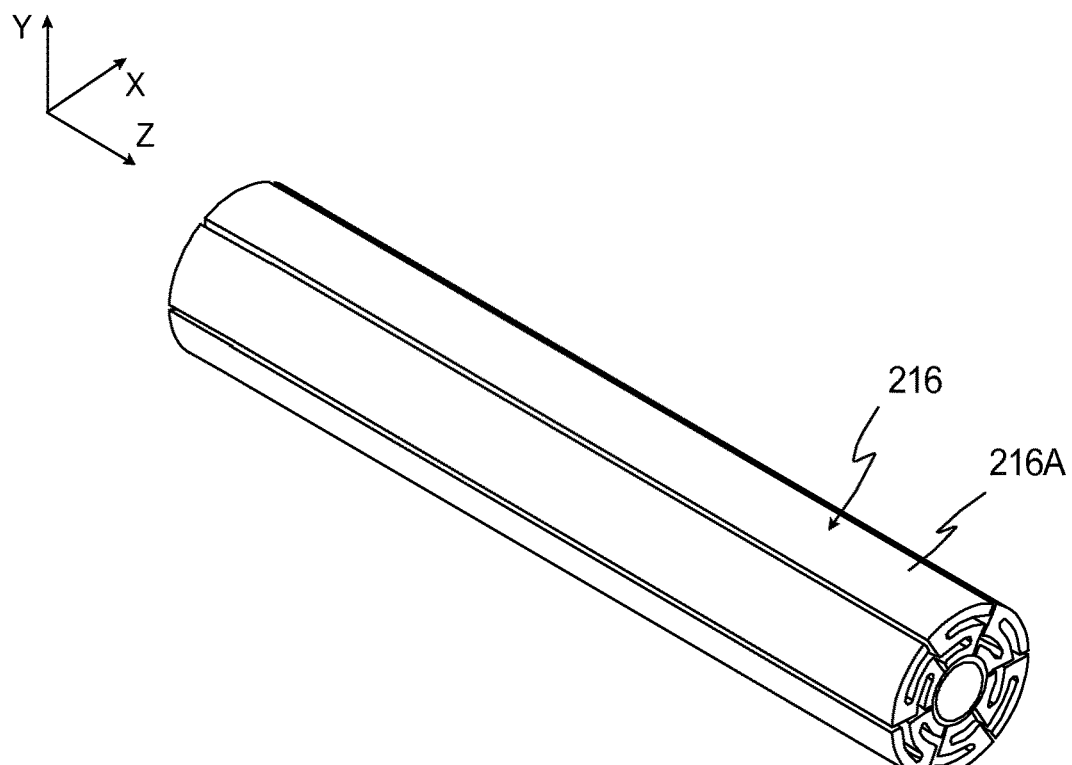
FIG. 2B is a perspective view of a first clamp component of the clamp of FIG. 2A.
Figure 2C:
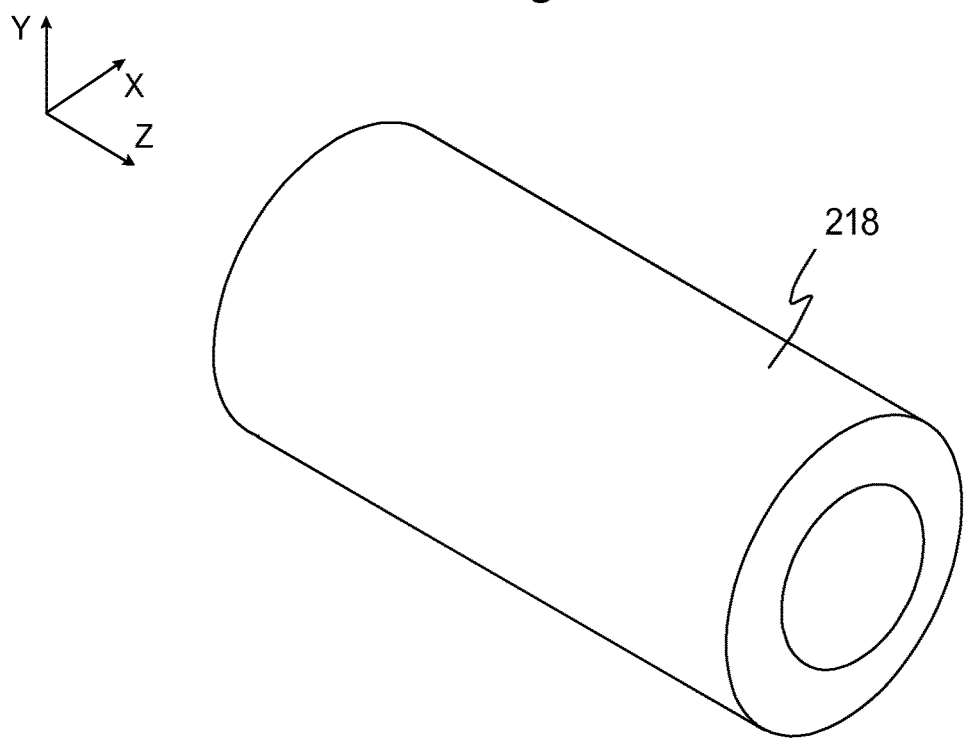
FIG. 2C is a perspective view of a second clamp component of the clamp of FIG. 2A.

In FIGS. 2A-2C, the first clamp component 216 is generally cylindrical shaft shaped and the second clamp component 218 is generally annular tube shaped and is sized and shaped to receive a compressed first clamp component 216.

Further, in this embodiment, the first clamp component 216 is a compressed/shrunk oversized shaft that is inserted inside the second clamp component 218 (e.g. a tubular shaped air-bushing) while the fluid source 220 directs the fluid 220A to the second clamp component 218. If the fluid source 220 is turned off (or the pressure sufficiently reduced), the outer diameter of the shaft 216 expands and makes contact with the inner sidewalls of the second clamp component 218, and the friction resulting from this contact holds/clamps the shaft 216 in place. If the fluid source 220 is turned on again (or the pressure sufficiently increased), the shaft 216 is compressed (and the outer diameter is decreased), and the fluid bearing 21 (illustrated in FIG. 1B) allows smooth stiction free motion of the shaft 216 along the movement axis 224. These types of air bushings 21 can take large side/radial loads while still allowing smooth unrestricted gliding along the movement axis 224. As provided herein, the press-fit of the oversized shaft 216 can be increased to achieve the desired clamping load when the fluid source 220 is off.

Referring to FIG. 2B, the first clamp component 216 can include one or more deformable sections 216A that extend radially from a center of the first clamp component 216. In FIG. 2B, the first clamp component 216 includes six deformable sections 216A with each deformable sections 216A having an "S" shaped cross section. With this design, the deformable sections 216A allow for the first clamp component 216 to be expanded and compressed radially. Stated in another fashion, the deformable sections 216A allow the shaft 216 to be radially compliant.

With this design, the first clamp component 216 can be a radially shrinkable/compressible shaft that has an outer expanded diameter and an outer compressed diameter that is smaller than the expanded diameter. As a result thereof, the first clamp component 216 is biased to move to the clamped configuration 211A. For example, the shaft 216 can be made of aluminum and can be wired EDM'ed to be very compliant radially.

Referring to FIGS. 2B and 2C, the second claim clamp component 218 can be a tubular shaped air bushing that has a bushing inner diameter that is smaller than the outer expanded diameter of the shaft 216 and larger than the outer compressed diameter of the shaft 216. With this design, the shaft 216 is radially shrunk/compressed to fit inside the air bushing 218. If the fluid source 220 is turned off (or the pressure sufficiently reduced), the shaft 216 makes contact with the sidewalls of the second clamp component 218, and the friction resulting from this contact holds/clamps the shaft 216 in place. If the fluid source 220 is turned on again (or the pressure sufficiently increased), the shaft 216 is compressed, and the fluid bearing allows smooth stiction free motion of the shaft 216 along the movement axis.

In certain embodiments, it is desired that the radial load on the shaft 216 is exactly the same whether the fluid source 220 is off or on so that there is no change in the loads and deformations of the shaft 216 or the surrounding system resulting from engaging or disengaging the clamp assembly 215.

To approach this design, the shaft 216 must be made as compliant and oversized as possible. In one example, the air (fluid) gap is typically four microns (4 um) so the radial compression of the shaft 216 changes by four microns (4 um) when the fluid source 220 is switched on and off. If the shaft 216 is radially compressed five hundred microns (500 um) initially to be inserted in the bushing 218, then the four micron (4 um) additional compression is very small in comparison and will result in only a 0.8 percent change in radial load. This is why the shaft 216 can be wire EDM cut to have embedded flexures that give it large radial compliance.

The exact shaft 216 design depends on a number of factors, including the size of the bushing 218 chosen, the resolution of the EDM process on the shaft 216 material being used, and the tolerance on the change in radial load resulting from clamping action. The latter depends on the position stability desired during clamping action and the stiffness and symmetry of the rest of the system. However, in general it is desired to have symmetric opposing flexure geometries that constrain the outer surface of the shaft 216 to move only in the radial direction without rotation or axial motion.

In addition, the outer surface of the shaft 216 may need to be machined in the compressed/shrunk state so that it is perfectly cylindrical when placed inside the bushing 218. One method for doing the latter is to make an extra long shaft 216 that is compressed and chucked on both ends and machined in the middle on a lathe. After machining, the ends that may have been damaged from the chucking can be sliced off. The shafts 216 may be compressed by special fixtures and inserted inside the air-bushings 218 or a special tapered air-bushing 218 can be made for the purpose of compressing shafts 216 and feeding them into standard air-bushings 218. For example, the air-bushing 218 can include a non-linear, inner diameter taper, with more taper on the wide end and less taper on the narrow end for smooth insertion.

Figure 3A:
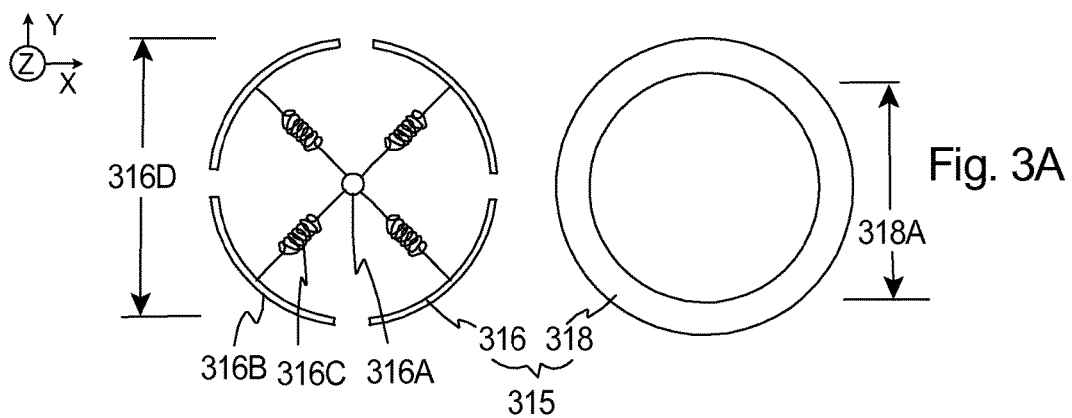
FIG. 3A is a simplified end view of the first clamp component and the second clamp component of the clamp assembly in an unassembled configuration.

FIG. 3A is a simplified schematic end view of the first clamp component 316 and the second clamp component 318 of the clamp assembly 315 in an unassembled configuration (e.g. with the first clamp component 316 not positioned within the second clamp component 318).

The embodiment in FIG. 3A is somewhat similar to that illustrated in FIG. 2A. However, in FIG. 3A, the first clamp component 316 includes a tubular shaped structure that is cut into a plurality of curved segments, and one or more springs. More specifically, in this simplified example, the first clamp component 316 includes a rigid center hub 316A (e.g. a cylindrical shaped rod), a plurality of rigid, arch shaped segments 316B (e.g. segments of a tube), and a plurality of resilient members 316C (e.g. springs) that attach the arch shaped segments 316B to the hub 316A, with the segments 316B encircling the hub 316A. In this embodiment, the resilient members 316C attach and urge the segment 316B radially outward from the hub 316A. Further, the first clamp component 316 has an outer diameter 316D that is relatively large in the relaxed configuration illustrated in FIG. 3A and smaller in a compressed configuration (illustrated in FIG. 3B).

In this embodiment, the second clamp component 318 is again a tubular shaped (e.g. annular) fluid bushing, and the first clamp component 316 fits within the second clamp component 318. Further, the second clamp component 318 has an inner diameter 318A that is less than the outer diameter 316D of the first clamp component 316 in the relaxed configuration, but greater than outer diameter 316D of the first clamp component 316 in the compressed configuration.

Figures 3B, 3C:
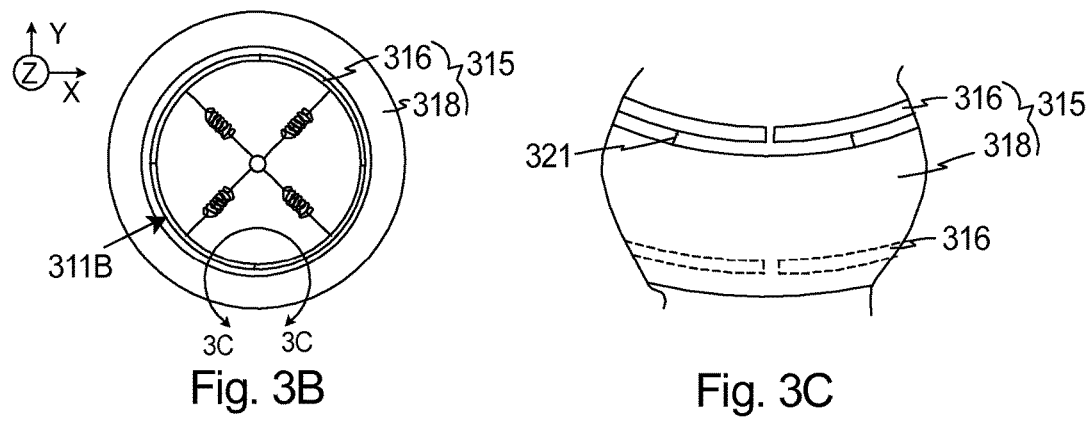
FIG. 3B is a simplified end view of the clamp assembly in the unclamped configuration.
FIG. 3C is an enlarged view taken from FIG. 3B.

FIG. 3B is a simplified end view of the clamp assembly 315 in the unclamped configuration 311B, and FIG. 3C is an enlarged view taken from FIG. 3B. In the unclamped configuration 311B, the fluid bearing 321 (illustrated in FIG. 3C as arrows) created between the clamp components 316, 318 has radially compressed the first clamp component 316 so that the outer diameter 316D (illustrated in FIG. 3A) of the first clamp component 316 is less than the inner diameter 318A (illustrated in FIG. 3A) of the second clamp component 318. At this time, the clamp components 316, 318 are free to move relative to each other along the Z axis. It should be noted that a portion of the first clamp component 316 is illustrated in phantom in the relaxed configuration to illustrate the radial compression of the first clamp component 316 in the unclamped configuration 311B.

Figures 3D, 3E:
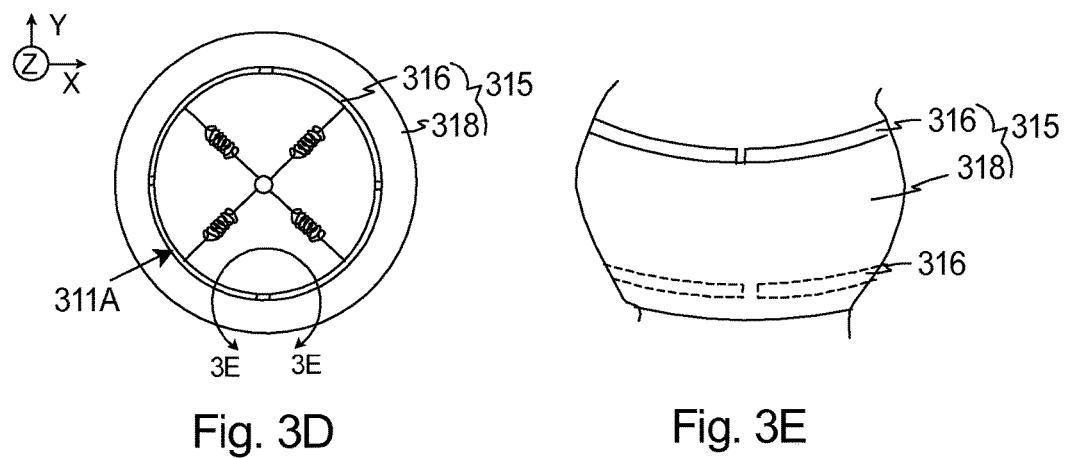
FIG. 3D is a simplified end view of the clamp assembly in the clamped configuration.
FIG. 3E is an enlarged view taken from FIG. 3D.

FIG. 3D is a simplified end view of the clamp assembly 315 in the clamped configuration 311A, and FIG. 3E is an enlarged view taken from FIG. 3D. In the clamped configuration 311A, the fluid bearing 321 (illustrated in FIG. 3C as arrows) is off, and the first clamp component 316 has radially expanded to a partly compressed configuration so that the outer diameter 316D (illustrated in FIG. 3A) of the first clamp component 316 is equal to the inner diameter 318A (illustrated in FIG. 3A) of the second clamp component 318. Stated in another fashion, in the clamped configuration 311A (fluid source is off), the first clamp component 316 has radially expanded so that the outer diameter 316D of the first clamp component 316 engages the inner diameter 318A of the second clamp component 318. At this time, the clamp components 316, 318 are inhibited from moving relative to each other along the X, Y, and Z axes, and about the X, Y, and Z axes. It should be noted that a portion of the first clamp component 316 is illustrated in phantom in the relaxed configuration to illustrate the radial compression of the first clamp component 316 in the clamped configuration 311A.

With reference to FIGS. 3A-3E, in this embodiment, when the fluid source (not shown) is off, the resilient members 316C push the segments 316B outward into the inner wall of the fluid bushing 318, providing clamping force between the two pieces. Alternatively, when the fluid source is on, the fluid bearing 321 created pushes the spring-loaded segments 316B inward towards the hub 316A. This will allow the first clamp component 316 to slide in and out of the second clamp component 318.

Figure 4A:
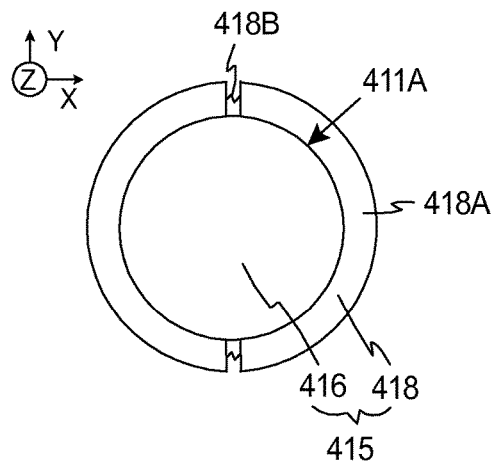
FIG. 4A illustrates yet another embodiment of a clamp assembly in a clamped configuration.
Figure 4B:
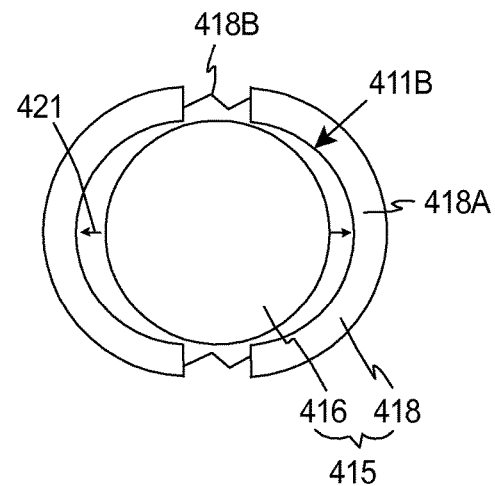
FIG. 4B illustrates the clamp assembly of FIG. 4A in an unclamped configuration.

FIG. 4A illustrates yet another embodiment of a clamp assembly 415 in a clamped configuration 411A and FIG. 4B illustrates the clamp assembly 415 of FIG. 4A in an unclamped configuration 411B. It should be noted that the design of FIGS. 4A and 4B is basically the reverse of the design illustrated in the Figures above, with the compliant section on the outside and the rigid bearing on the inside. More specifically, in this embodiment, the first clamp component 416 is a rigid shaft (e.g. a cylindrical rod), and the second clamp component 418 includes (i) a plurality of arch shaped segments 418A (e.g. segments of a tube) that cooperate to encircle the shaft 416, and (ii) a plurality of resilient members 418B (e.g. one or more springs) that urge the segments 418A together against the shaft 416. It should be noted that the design and number of segments 418A and resilient members 418B can be varied to suit the design requirements of the clamp assembly 415.

In this embodiment, when the fluid source (not shown) is off (or the pressure is reduced), the resilient members 418B pull the segments 418A inward onto the outer wall of the shaft 416, providing clamping force between the two pieces. Alternatively, when the fluid source is on, a fluid bearing 421 (illustrated as arrows) is created that pushes the spring-loaded segments 418A outward away from the shaft 416A. This will allow for relative movement of the first clamp components 416, 418 along the Z axis (slide in and out of the page).

Alternatively, in another non-exclusive example, the outer arch-shaped segments with springs of the second clamp component 418 can be replaced with a radially compliant (e.g. wire-EDMed) cylinder having inward-facing S-shaped (other shaped) springs.

Figure 5A:
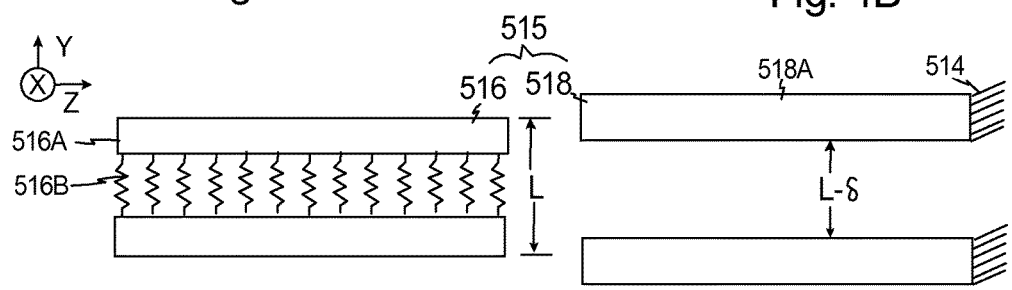
FIG. 5A illustrates yet another embodiment of a clamp assembly prior to assembly.
Figure 5B:
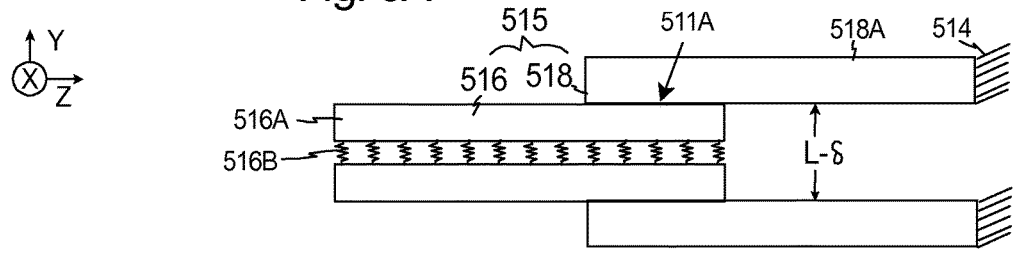
FIG. 5B illustrates the clamp assembly of FIG. 5A in the clamped configuration.
Figure 5C:
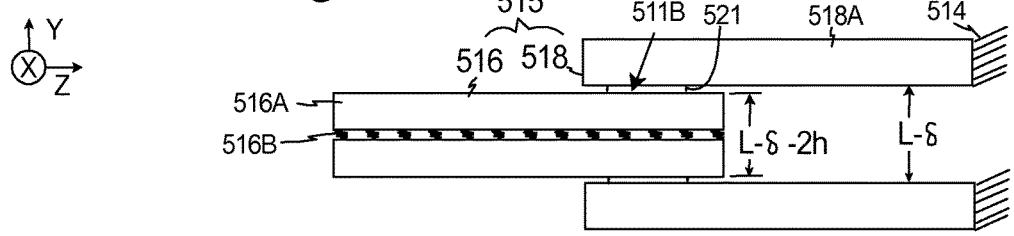
FIG. 5C illustrates the clamp of FIG. 5A in the unclamped configuration.

FIG. 5A illustrates yet another embodiment of a clamp assembly 515 prior to assembly (the first clamp component 516 in the relaxed state not positioned within the second clamp component 518), FIG. 5B illustrates the clamp assembly 515 of FIG. 5A in a clamped configuration 511A with the first clamp component 516 positioned within and against the second clamp component 518, and FIG. 5C illustrates the clamp assembly 515 of FIG. 5A in an unclamped configuration 511B with the first clamp component 516 positioned within the second clamp component 518. In this embodiment, the clamp assembly 515 has a planar configuration, with (i) the first clamp component 516 having a pair of spaced apart first plates 516A, and a plurality of resilient members 516B (e.g. springs) that urge the plates 516A apart; and (ii) the second clamp component 518 includes a pair of spaced apart second plates 518A that are fixedly secured to the second object 514 (e.g. a wall). In this embodiment, the resilient members 516B act as a bias assembly that urges the first clamp component 516 toward the clamped configuration 511A. Further, in one non-exclusive embodiment, each plate 516A, 518A is a generally rectangular shaped, rigid structure. Alternatively, one or more of the plates 516A, 518A can have another shape.

Moreover, in this embodiment, as illustrated in FIG. 5B, when the fluid source (not shown) is off or the pressure is sufficiently reduced, the resilient members 516B push the first plates 516A away from each other up and down against the second plates 518A, providing clamping force between the first clamp component 516 positioned within the second clamp component 518. Alternatively, as illustrated in FIG. 5C, when the fluid source is on, a fluid bearing 521 is created that pushes the spring-loaded first plates 516A towards each other, away from the second plates 518A. With this design, this will allow the first clamp component 516 to slide left and right across the page along the Z axis, and/or slide into and out of the page along the X axis, and/or rotate about the Y axis relative to the second clamp component 518.

Additionally, in this embodiment, (i) in the relaxed state illustrated in FIG. 5A, the first plates 516A have a height of "L", (ii) in the clamped configuration 511A illustrated in FIG. 5B, the first plates 516A have a height of L-δ and the second plates 518A are separated a distance of L-δ, and (iii) in the unclamped configuration 511B illustrated in FIG. 5C, the first plates 516A have a height of L-δ-2h, where h is the size (e.g. thickness) of the fluid bearing 521 on each side of the first clamp component 516. In this example, (i) in the clamped configuration 511A, the vertical force is equal to kδ, and (ii) in the unclamped configuration 528, the fluid bearing force is equal to k(δ+2h), where k is the spring constant of the resilient members 516B.

In this embodiment, the resilient members 516B act as a bias assembly that urges the first clamp component 516 towards the clamped configuration 511A. It should be noted that the design can be reversed (double-sided air bearing in middle, springs on top/bottom).

Figure 6A:
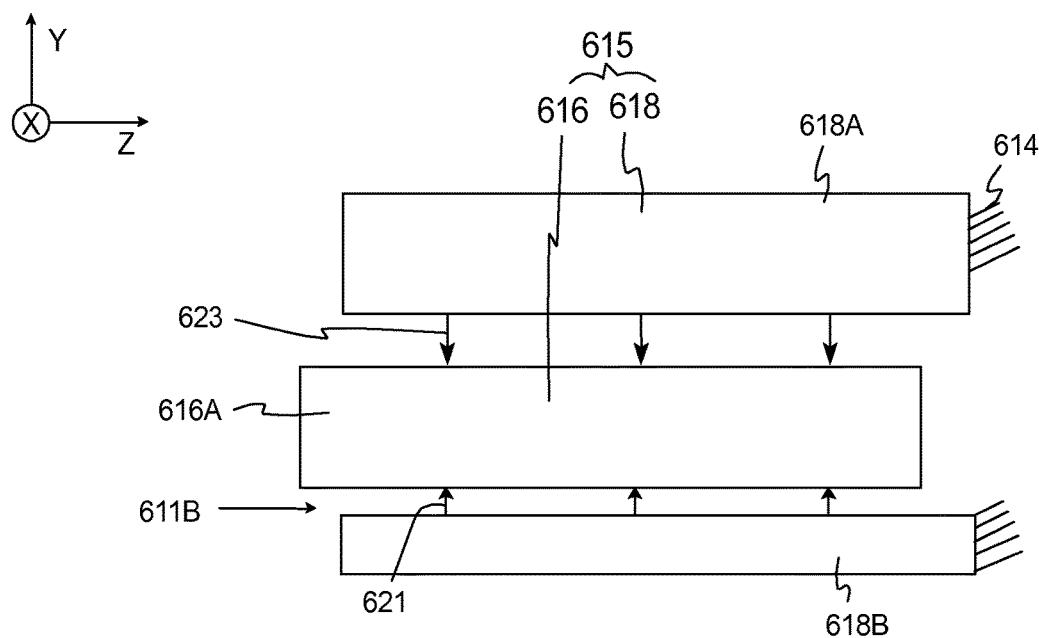
FIG. 6A illustrates yet another embodiment of a clamp assembly in an unclamped configuration.

FIG. 6A illustrates yet another embodiment of a clamp assembly 615 in an unclamped configuration 611B, and FIG.

6B illustrates the clamp assembly 615 of FIG. 6A in a clamped configuration 611A. In this embodiment, the clamp assembly 615 again has a planar configuration, with (i) the first clamp component 616 including a first plate 616A; and (ii) the second clamp component 618 including an upper second plate 618A and a lower second plate 618B that are fixedly secured to the second object 614 (e.g. a wall). In this embodiment, the first plate 616A is positioned between the two second plates 618A, 618B. Further, in one non-exclusive embodiment, each plate 616A, 618A is a generally rectangular shaped, rigid structure. Alternatively, one or more of the plates 616A, 618A can have another shape.

Figure 6B:
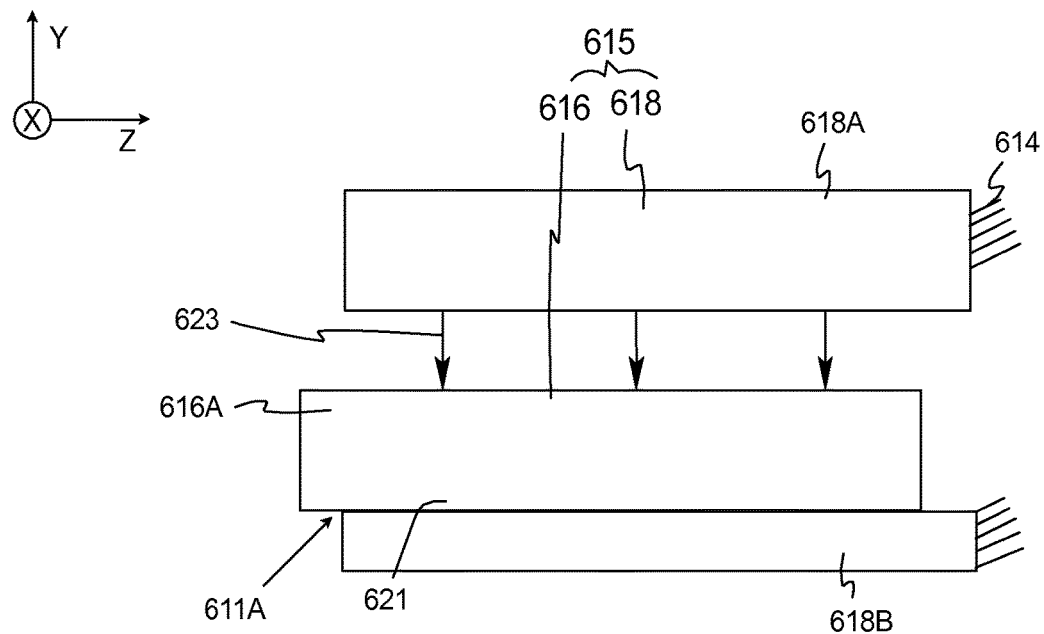
FIG. 6B illustrates the clamp assembly of FIG. 6A in a clamped configuration.

In the unclamped configuration 611B, the fluid source (not shown in FIGS. 6A and 6B) directs the fluid from the lower second plate 618B against the first plate 616A to create a lower fluid bearing 621 between the lower second plate 618B and the first plate 616A. With this design, this will allow the first clamp component 616 to slide left and right across the page along the X axis, and/or slide into and out of the page along the X axis, and/or rotate about the Y axis relative to the second clamp component 618.

It should be noted that, at this time, the fluid source can optionally direct fluid to the upper second plate 618A to create an upper fluid bearing 623 to urge the first plate 616A towards the lower second plate 618B to provide preload for the lower fluid bearing 621. In this embodiment, the upper fluid bearing 623 and the mass of the first plate 616A acts as a bias assembly that urges the first clamp component 616 towards the clamped configuration 611A.

At this time, the pressure to the upper second plate 618A can be less than that directed to the lower second plate 618B, or the gap between the upper second plate 618A and the first plate 616A can be larger than the gap between the lower second plate 618B and the first plate 616A (e.g. larger leak rate). Alternatively, in the unclamped configuration 611B, the fluid source 20 can stop directing fluid to the upper second plate 618A.

In contrast, in the clamped configuration 611A, the fluid source can stop directing the fluid from the lower second plate 618B and direct fluid to the upper second plate 618A to create the upper (clamping) fluid bearing 623 against the first plate 616A. This causes the first plate 616A to be urged downward against the lower second plate 618B in the clamped configuration 611A to inhibit movement.

It should be noted that the fluid can be directed from the first clamp component 616 to create one or both of the fluid bearings instead of from the second clamp component 618.

Figure 7A:
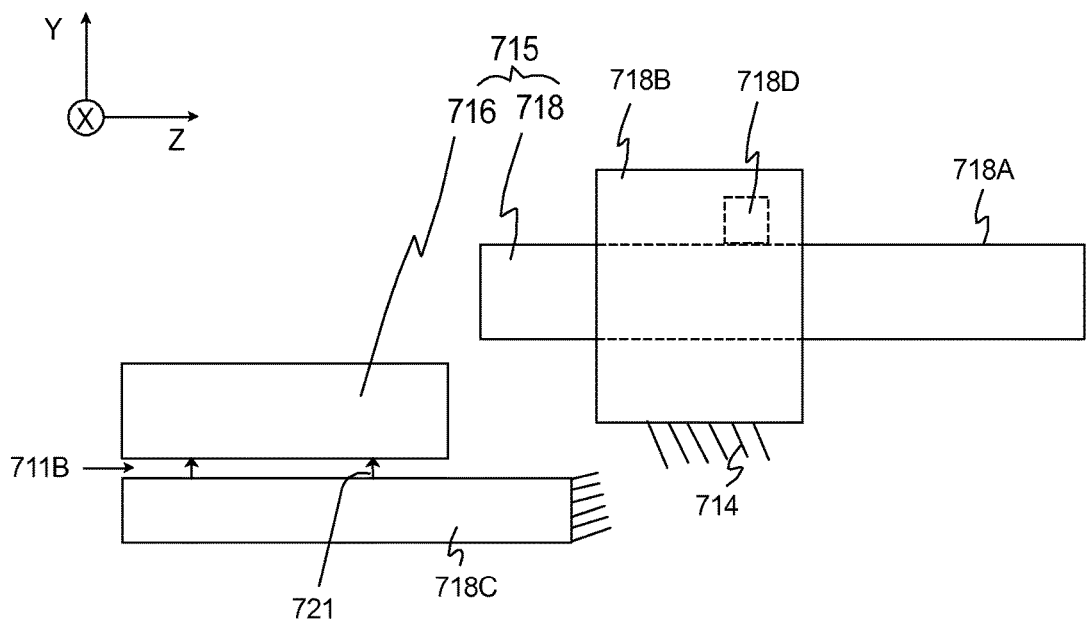
FIG. 7A illustrates yet another embodiment of a clamp assembly in an unclamped configuration.
Figure 7B:
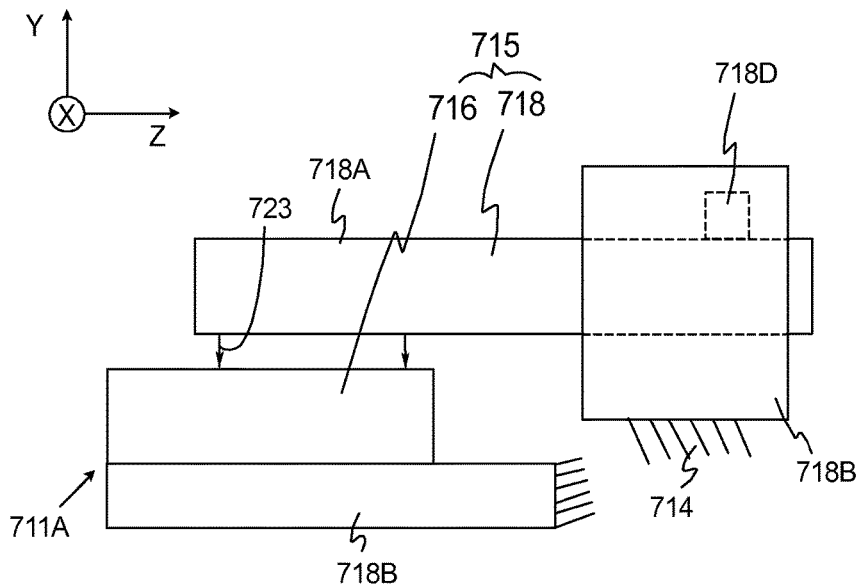
FIG. 7B illustrates the clamp assembly of FIG. 7A in a clamped configuration.

FIG. 7A illustrates yet another embodiment of a clamp assembly 715 in an unclamped configuration 711B, and FIG. 7B illustrates the clamp assembly 715 of FIG. 7A in a clamped configuration 711A. In this embodiment, the clamp assembly 715 again has a planar configuration, and the second clamp component 718 includes an upper retractable plate 718A, a plate guide 718B (e.g. a linear guide) that is secured to the second object 714, and a lower plate 718C that is also secured to the second object 714. In this embodiment, the retractable plate 718A is movable supported by the plate guide 718B and guided for movement along the Z axis. In this embodiment, the retractable plate 718A is movable along the Z axis between (i) a retracted position illustrated in FIG. 7A in which the retractable plate 718A is not positioned over the first clamp component 716, and (ii) an extended position illustrated in FIG. 7B in which the retractable plate 718A is position over the first clamp component 716. As a non-exclusive example, an actuator 718D can be used to selectively move the retractable plate 718A. Further, in one non-exclusive embodiment, each plate 716A, 718A, 718C is a generally rectangular shaped, rigid structure. Alternatively, one or more of the plates 716A, 718A, 718C can have another shape.

In the unclamped configuration 711B, the retractable plate 718A is in the retracted position, and the fluid source directs the fluid from the lower plate 718C against the first clamp component 716 (and/or the first clamp component 716 against the lower plate 718C) to create a lower fluid bearing 721 between the lower plate 718C and the first clamp component 716. With this design, this will allow the first clamp component 716 to slide left and right across the page along the Z axis, and/or slide into and out of the page along the X axis, and/or rotate about the Y axis relative to the second clamp component 718.

In contrast, in the clamped configuration 711A, the retractable plate 718A is in the extended position, the fluid source stops directing (or sufficiently reduces the pressure of) the fluid from the lower second plate 718C (and/or the first clamp component 716), and fluid is directed to the retractable plate 718A (and/or the first clamp component 716) to create the upper fluid bearing 723 against the first plate 716A. This causes the first clamp component 716 to be urged downward against the lower plate 718C in the clamped configuration 711A to inhibit movement. Still alternatively, in the clamped configuration 711A, the pressure of the upper (clamping) fluid bearing 723 can be sufficiently great to overcome the lower bearing 721 without a reduction in pressure.

In this embodiment, the upper fluid bearing 723 and the mass of the first clamp component 716 acts as a bias assembly that urges the first clamp component 716 towards the clamped configuration 711A.

Figure 8A:
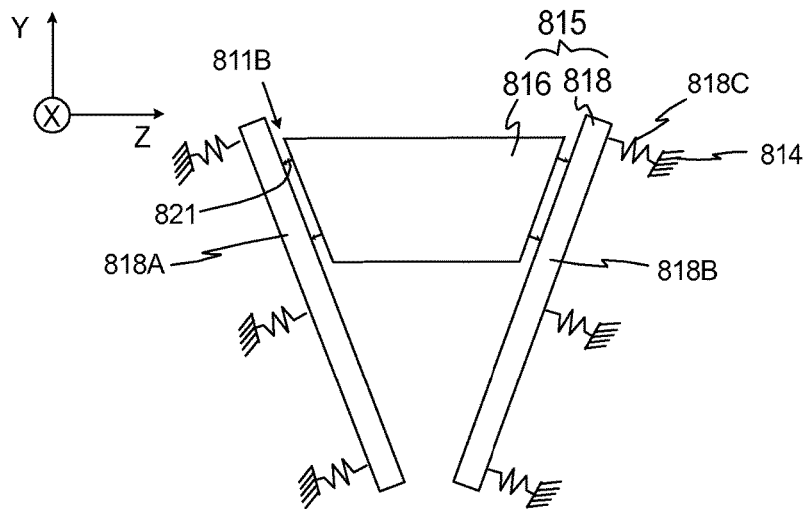
FIG. 8A illustrates yet another embodiment of a clamp in a first unclamped configuration.
Figure 8B:
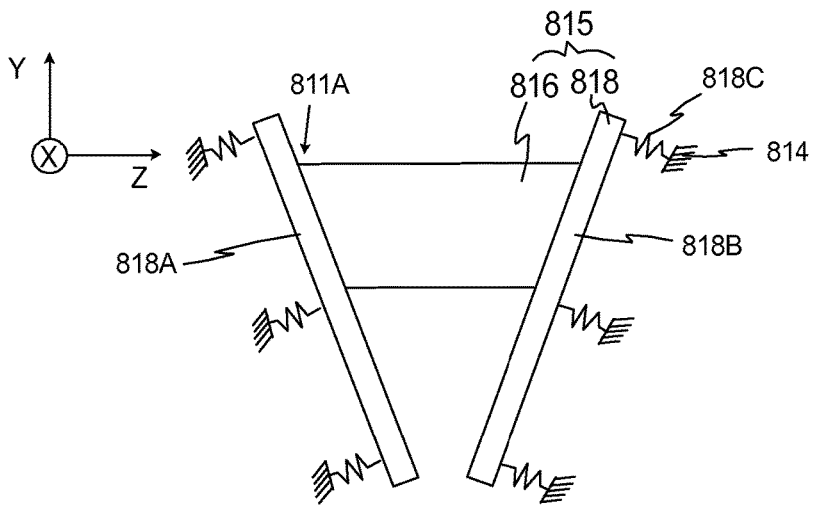
FIG. 8B illustrates the clamp of FIG. 8A in a clamped configuration.
Figure 8C:
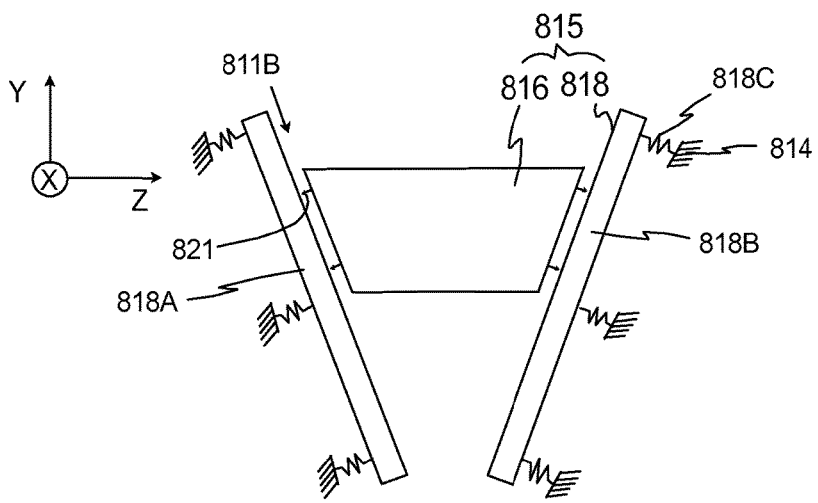
FIG. 8C illustrates the clamp of FIG. 8A in a second unclamped configuration.

FIG. 8A illustrates yet another embodiment of a clamp assembly 815 in a first unclamped configuration 811B, FIG. 8B illustrates the clamp assembly 815 of FIG. 8A in a clamped configuration 811A; and FIG. 8C illustrates the clamp of FIG. 8A in a second unclamped configuration 811B. In this embodiment, the clamp assembly 815 includes (i) the first clamp component 816 which is shaped somewhat similar to a wedge; and (ii) the second clamp component 818 includes a left second plate 818A and a right second plate 818B that cooperate to form a "V" shaped structure (defines a wedge shaped opening) that receives the first clamp component 816. In this embodiment, the second plates 818A, 818B are secured to the second object 814 (e.g. a wall) with resilient members 818C (e.g. springs) that allow for relative movement of the second plates 818A, 818B, and that urge the second plates 818A, 818B towards each other. Further, each plate 818A, 818B can be generally rectangular plate shaped.

In this embodiment, the wedge/cone shape of the second clamp component 818 expands/contracts to allow the somewhat similarly shaped first clamp component 816 to move up/down along the Y axis until the fluid is turned off (or the fluid pressure is sufficiently reduced), when clamping happens.

In the unclamped configuration 811B, the fluid source directs fluid from the sides of the first clamp component 816 against the second plates 818A, 818B to create the fluid bearing 821 on both sides of the first clamp component 816. Alternatively, the fluid source can direct the fluid from the second plates 818A, 818B against the first clamp component 816 to create the fluid bearing 812 on both sides of the first clamp component 816.

With this design, comparing FIGS. 8A and 8C, the fluid bearing 821 will allow the first clamp component 816 to slide up and down along the Y axis while changing the shape of the "V" formed by the second plates 818A, 818B.

In contrast, in the clamped configuration 811A, the fluid source stops directing the fluid (or reduces the pressure of the fluid) from the clamp assembly 815 to stop the fluid bearing 821. This causes the first clamp component 816 to rest against the second plates 818A, 818B to inhibit movement.

In this embodiment, the first clamp component 816 can alternatively be two cones or truncated cones. Further, the V-groove that can open with preload while maintaining same angle as the wedge.

In this embodiment, the mass of the first clamp component 816 acts as a bias assembly that urges the first clamp component 816 towards the clamped configuration 811A.

Figure 9A:
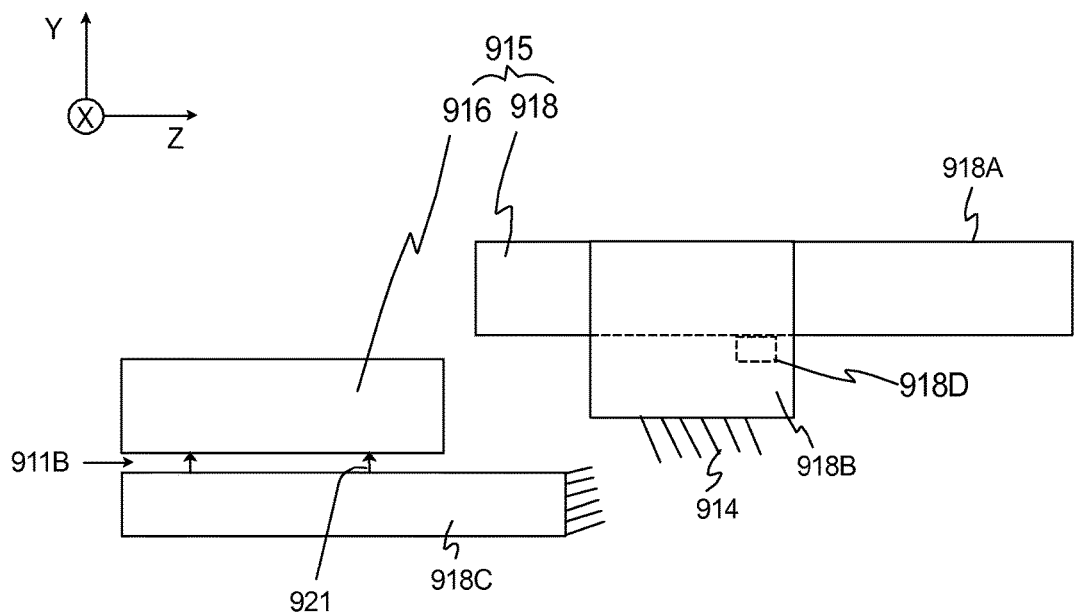
FIG. 9A illustrates still another embodiment of a clamp assembly in an unclamped configuration.
Figure 9B:
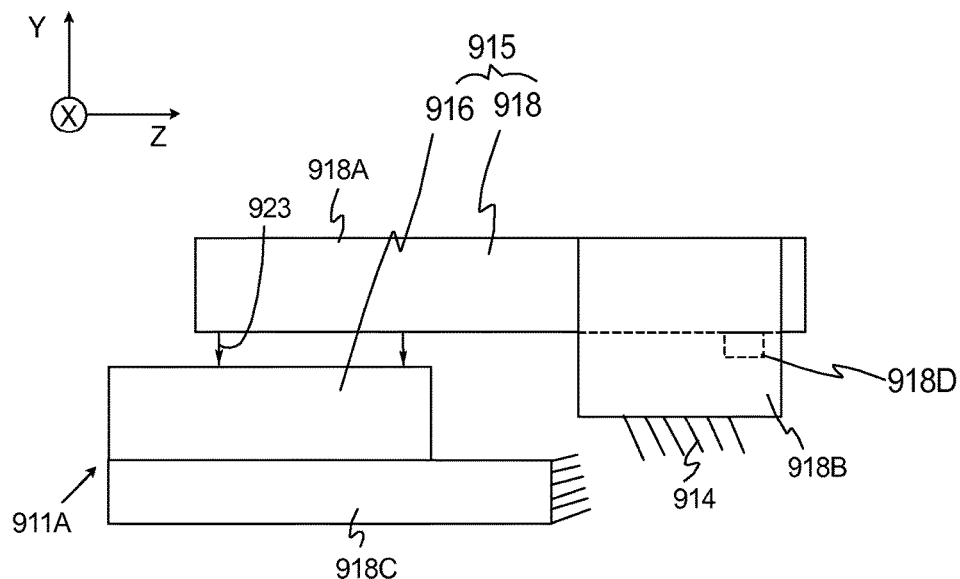
FIG. 9B illustrates the clamp assembly of FIG. 9A in a clamped configuration.

FIG. 9A illustrates yet another embodiment of a clamp assembly 915 in an unclamped configuration 911B, and FIG. 9B illustrates the clamp assembly 915 of FIG. 9A in a clamped configuration 911A. In this embodiment, the clamp assembly 915 again has a planar configuration and is somewhat similar to the clamp assembly 715 described above and illustrated in FIGS. 7A and 7B. In FIGS. 9A and 9B, the second clamp component 918 includes an upper retractable plate 918A, a plate guide 918B (e.g. a linear guide) that is secured to the second object 914, and a lower plate 918C that is also secured to the second object 914. In this embodiment, the retractable plate 918A is movable supported by the plate guide 918B and guided for movement along the Z axis. In this embodiment, the retractable plate 918A is movable along the Z axis between (i) a retracted position illustrated in FIG. 9A in which the retractable plate 918A is not positioned over the first clamp component 916, and (ii) an extended position illustrated in FIG. 9B in which the retractable plate 918A is position over the first clamp component 916. As a non-exclusive example, an actuator 918D can be used to selectively move the retractable plate 918A. Further, in one non-exclusive embodiment, each plate 916A, 918A, 918C is a generally rectangular shaped, rigid structure. Alternatively, one or more of the plates 916A, 918A, 918C can have another shape.

In the unclamped configuration 911B, the retractable plate 918A is in the retracted position, and the fluid source directs the fluid from the lower plate 918C against the first clamp component 916 to create a lower fluid bearing 921 between the lower plate 918C and the first clamp component 916. With this design, this will allow the first clamp component 916 to slide left and right across the page along the Z axis, and/or slide into and out of the page along the X axis, and/or rotate about the Y axis relative to the second clamp component 718.

In contrast, in the clamped configuration 911A, the retractable plate 918A is in the extended position, the fluid source stops directing (or sufficiently reduces the pressure of) the fluid from the lower second plate 918C (and/or the first clamp component 916), and fluid is directed to the retractable plate 918A (and/or the first clamp component 916) to create the upper fluid bearing 923 against the first plate 916A. This causes the first clamp component 916 to be urged downward against the lower plate 918C in the clamped configuration 911A to inhibit movement. Still alternatively, in the clamped configuration 911A, the pressure of the upper fluid bearing 923 can be sufficiently great to overcome the lower bearing 921 without a reduction in pressure.

In this embodiment, the upper (clamping) fluid bearing 923 and the mass of the first clamp component 916 acts as a bias assembly that urges the first clamp component 916 towards the clamped configuration 911A.

As provided above, the embodiment illustrated in FIGS. 9A and 9B is similar to the embodiment illustrated in FIGS. 7A and 7B. However, in the embodiment in FIGS. 9A and 9B, the plate guide 918B only constrains the retractable plate 918A in a horizontal direction (e.g. the X direction). In this embodiment, the retractable plate 918A is not constrained in the vertical direction (along the Y axis) by the plate guide 918B. This could be advantageous because it may be hard to manufacture the plate guide 918B so that the retractable plate 918A extends perfectly parallel to the first clamp component 916. By not constraining the retractable plate 918B in the vertical direction, it can be allowed to float on top of the first clamp component 916 using the fluid bearing 921. In this example, the clamping force comes from the weight of the retractable plate 918B, rather than transferring force through the guide.

Figure 9C:
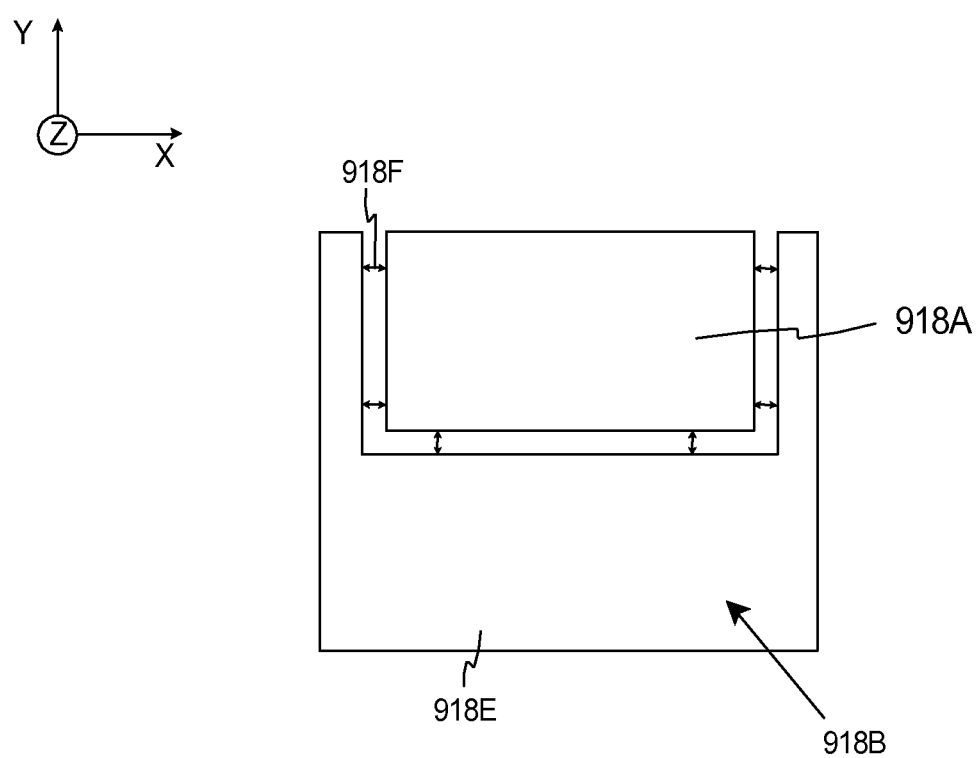
FIG. 9C is an end view of a portion of the clamp assembly of FIG. 9A.

FIG. 9C is an end view of a simplified, non-exclusive example of the plate guide 918B and the retractable plate 918A. In this embodiment, the plate guide 918B include a rectangular "U" shaped guide body 918E including a bottom and two sides. Further, a fluid bearing 918F is created between the bottom and sides of the body guide 918E and the retractable plate 918A that allows for movement along the Z axis and constrains movement along the X axis. Alternatively, the plate guide 918B can include one or more bearings or other types of guides.

Figure 10A:
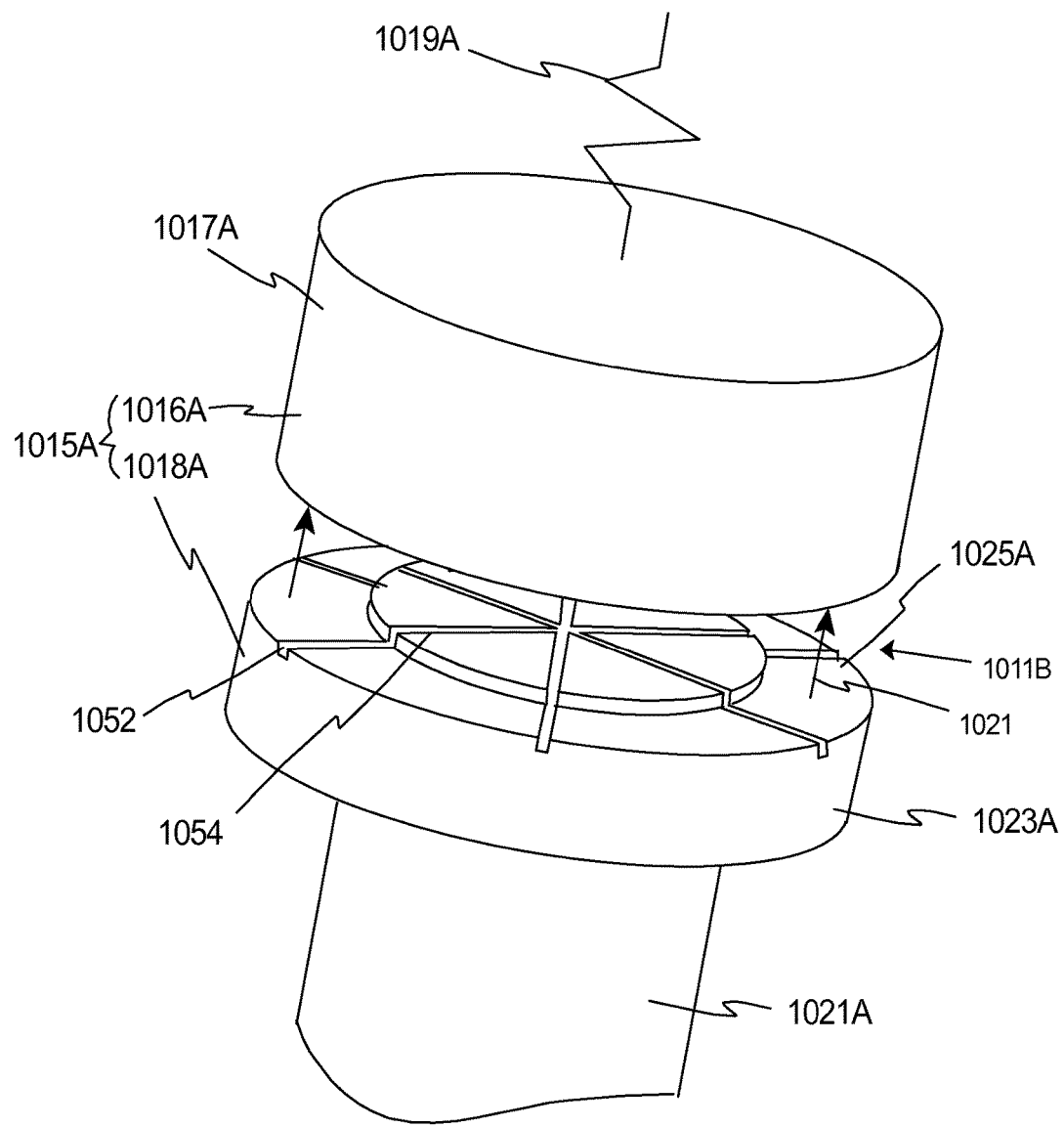
FIG. 10A illustrates another embodiment of a clamp.

FIG. 10A illustrates yet another embodiment of a clamp assembly 1015A in an unclamped configuration 1011B. In this embodiment, the clamp assembly 1015A includes (i) the first clamp component 1016A having a disk shaped first base 1017A and a bias assembly 1019A that urges the first base 1017A towards the second clamp component 1018A; and (ii) the second clamp component 1018A includes a rod shaped second base 1021A, and an annular shaped bearing structure 1023A that encircles and is secured to the second base 1021A.

In the unclamped configuration 1011B, the fluid source (not shown) directs the fluid from the bearing structure 1023A (or the first base 1017A) to create a fluid bearing 1021 between the first base 1017A and the second clamp component 1018A. This will allow the first clamp component 1016A to move with three degrees of freedom relative to the second clamp component 1018A.

In contrast, in the clamped configuration (not shown), the fluid source stops directing the fluid (or sufficiently reduces the pressure of the fluid) from the bearing structure 1023A and the bias assembly 1019A urges the first base 1017A against the second clamp component 1018A to provide the clamping force to inhibit relative movement.

In FIG. 10A, the bias assembly 1019A is passive and includes a resilient member such as a spring. Although only one spring is shown, it should be known that a plurality of springs or resilient members can be used. Alternatively, the bias assembly 1019A can include (i) a fluid cylinder; (ii) another air-bearing; (iii) a voice coil or solenoid; (iv) a Piezo-electric actuator; (v) a magnet and a steel or other magnetic material, and/or (vi) another actuator providing the clamping force. In certain embodiments, the biasing force is magnetic or electrostatic. Further, the bias assembly 1019A can generate a passive force.

Alternatively, the second clamp component 1018A can be designed without the second base 1023A.

In FIG. 10A, the bearing structure 1023A can include a fluid bearing surface 1025A which can be porous, consist of multiple orifices, or have a single orifice with air communication grooves. The volume can interact as a plenum or fluid capacitor. The volume can be sized to achieve desired dynamic properties and reduce air-hammer, vibration, or instability.

In this embodiment, the clamp components 1016A, 1018A cooperate to define a pair of adjacent surfaces 1025A, 1025B and wherein at least one of the adjacent surfaces 1025A, 1025B includes one or more surface features 1052 that inhibits an air hammer effect. More specifically, in certain embodiments, (i) the fluid bearing surface 1025A of the bearing structure 1023A can also include one or more grooves 1052, for example, as needed to prevent air-hammer, instability, or vibrations; and/or (ii) the top of the shaft 1021A can include one or more grooves 1054 as needed to prevent air-hammer, instability, or vibrations. In the non-exclusive embodiment illustrated in FIG. 10A, the grooves 1052, 1054 extend radially from the center. Alternatively, one or both of the adjacent surfaces 1025A, 1025B can be designed without the grooves. Still alternatively, instead of the grooves, one or both of the adjacent surfaces 1025A, 1025B can include a plurality of spaced apart projections that function as surface features 1052 that inhibit the air hammer effect.

Figure 10B:
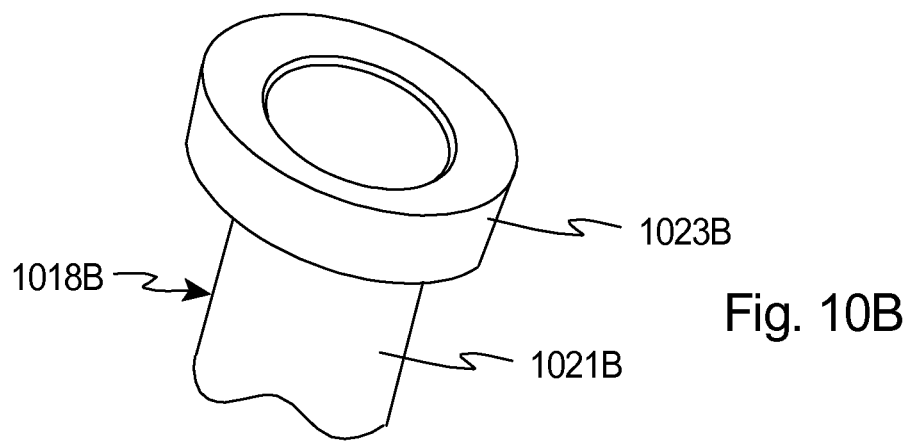
FIGS. 10B, 10C, and 10D illustrate three alternative embodiments of the second clamp component.
Figure 10C:
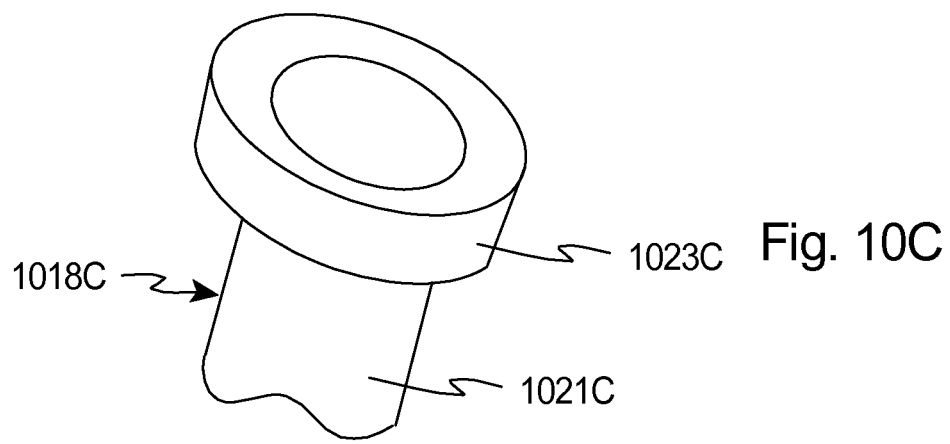
Figure 10D:
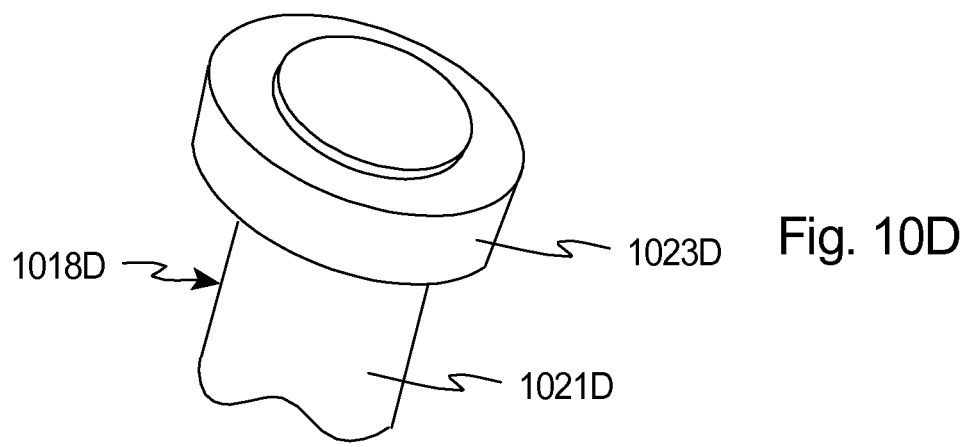

FIGS. 10B, 10C, and 10D illustrate three alternative embodiments of the second clamp component 1018B, 1018C, 1018D with the position of the shaft 1021B, 1021C, 1021D relative to the hollow ring shaped bearing structure 1023B, 1023C, 1023D different in each embodiment. In each embodiment, the bearing structure 1023B, 1023C, 1023D is fixedly secured to the respective shaft 1021B, 1021C, 1021D. However, (i) in FIG. 10B, the upper surface of the shaft 1021B is recessed from the upper surface of the bearing structure 1023B; (ii) in FIG. 10C, the upper surface of the shaft 1021C is level or flush with the upper surface of the bearing structure 1023C; and (iii) in FIG. 10D, the upper surface of the shaft 1021D is protruding from the upper surface of the bearing structure 1023D, for example to allow the first clamp component 1016A (illustrated in FIG. 10A) to land before the gap between the first clamp component 1016A and the respective bearing structure 1023B, 1023C, 1023D is zero, or this may be done to prevent air-bearing hammer, instability, or vibrations.

It should be noted that in these examples, both the bearing structure 1023B, 1023C, 1023D and the top of the shaft 1021B, 1021C, 1021D do not include grooves. However, grooves can be added to one or both to inhibit air-bearing hammer.

Figure 10E:
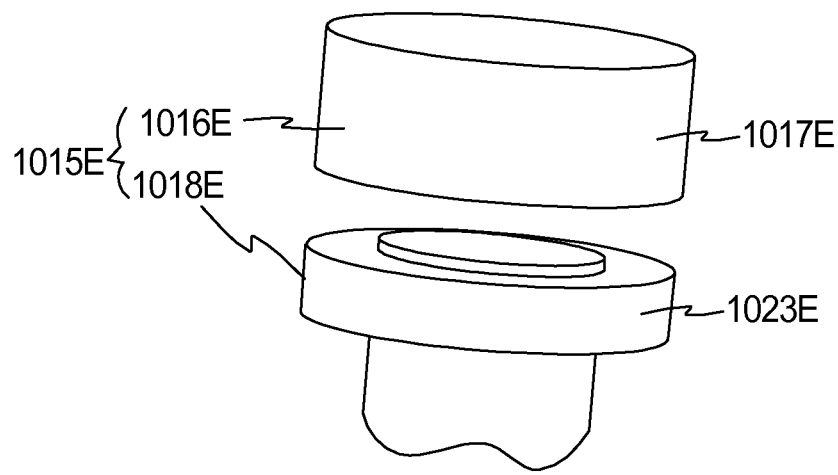
Figure 10F:
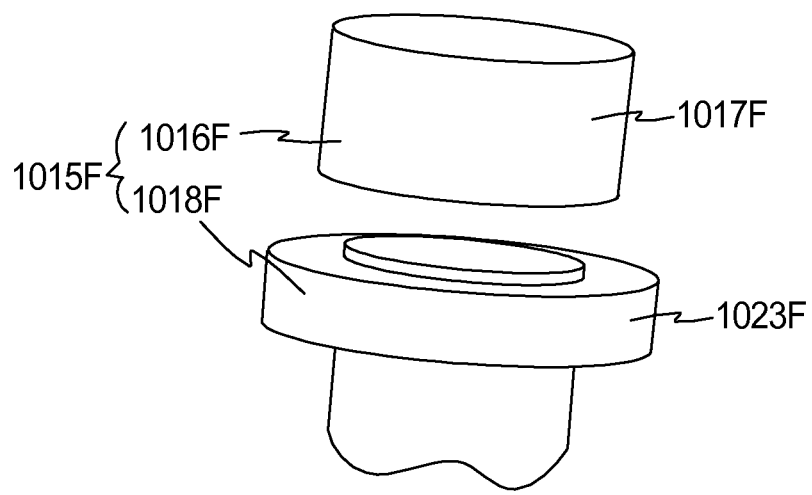
Figure 10G:
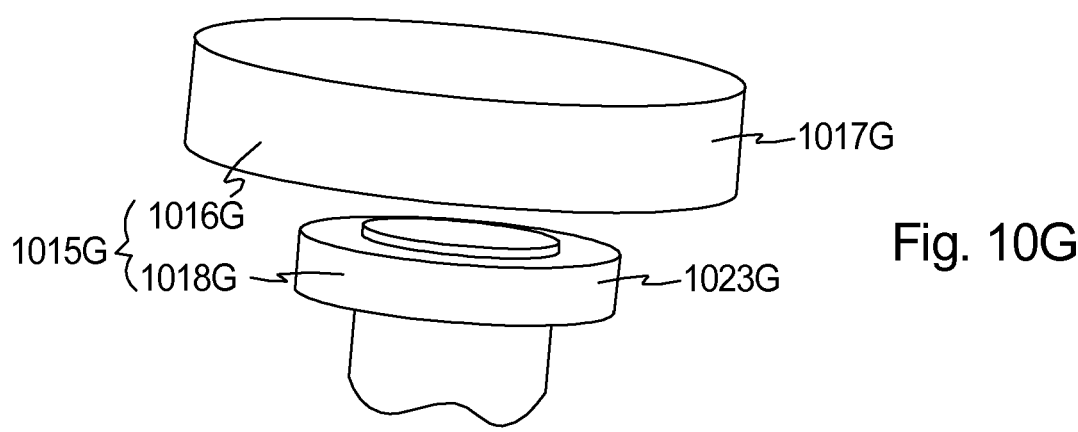

FIGS. 10E, 10F, 10O illustrate three alternative embodiments of the clamp assembly 1015E, 1015F, 1015G (without the bias assembly) including the first clamp component 1016E, 1016F, 1016G and the second clamp component 1018E, 1018F, 1018G, with the size of the first base 1017E, 1017F, 1017G of the first clamp component 1016E, 1016F, 1016G different in each embodiment. As non-exclusive examples, (i) as illustrated in FIG. 10E, the first base 1017E can be approximately the same diameter or size as the air-bearing surface 1023E; (ii) as illustrated in FIG. 10F, the first base 1017F can be smaller in diameter or size than the air-bearing surface 1023F; or (iii) as illustrated in FIG. 10O, the first base 1017G can be larger in diameter or size than the air-bearing surface 1023G.

Figure 10H:
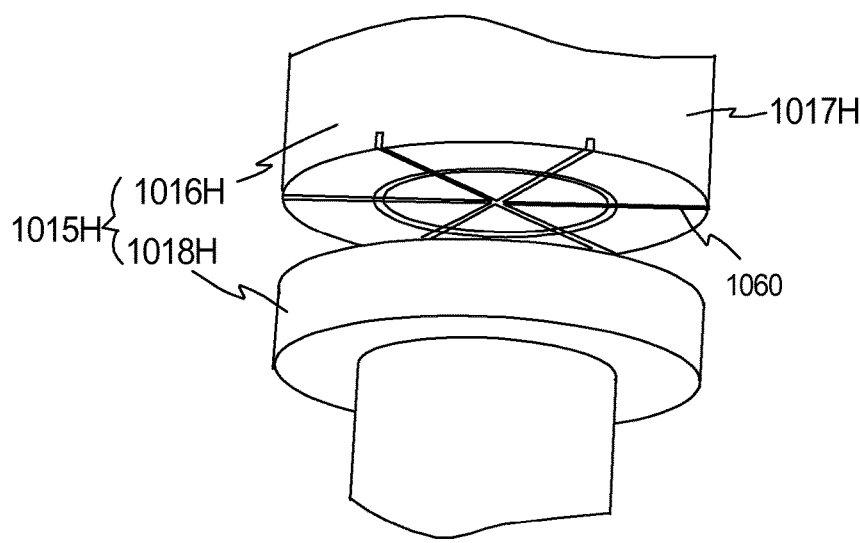
FIG. 10H illustrates another embodiment of the clamp.

FIG. 10H illustrates yet another embodiment of the clamp assembly 1015H (without the bias assembly) including the first clamp component 1016H and the second clamp component 1018H that are somewhat similar to the corresponding components described above with reference to FIG. 10A. In this embodiment, the first base 1017H of the first clamp component 1016H can include a plurality of communication grooves 1060, for example, as needed to prevent air-hammer, instability, or vibrations. Alternatively, instead of the grooves 1060, the first base 1017H can include a plurality of spaced apart projections.

Figure 10I:
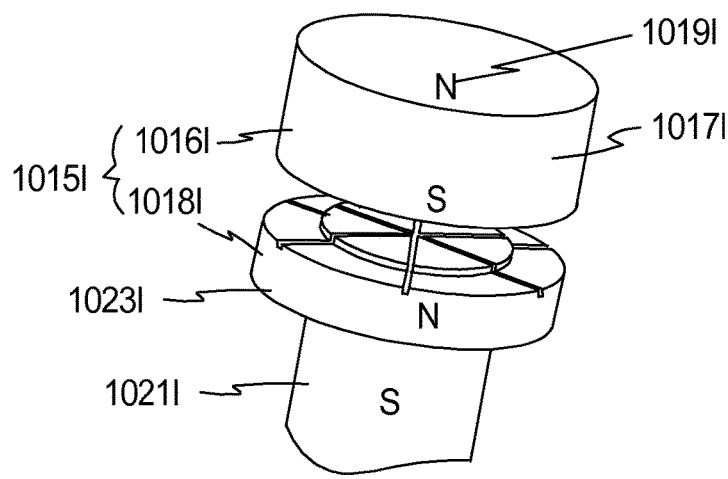
FIGS. 10I and 10J illustrate other clamps.
Figure 10J:
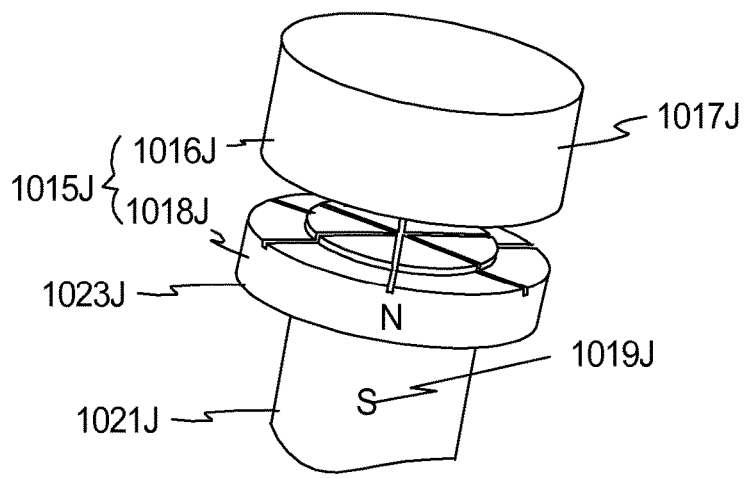

FIGS. 10I and 10J illustrate two additional alternative embodiments of the clamp assembly 1015I, 1015J including the first clamp component 1016I, 1016J and the second clamp component 1018I, 1018J with different examples of the bias assembly 1019I, 1019J.

More specifically, in FIG. 10I, the inner shaft 1021I inside the bearing structure 1023I can be a magnet and the first base 1017I can be a magnet to urge the first base 1017I towards the inner shaft 1021I and provide the clamping force when the fluid bearing (not shown) is off.

Alternatively, in FIG. 10J, the inner shaft 1021J inside the bearing structure 1023J can be a magnet that attracts the magnetic material (such as a ferromagnetic material) of the first base 1017J to urge the first base 1017J towards the inner shaft 1021J and provide the clamping force when the fluid bearing (not shown) is off.

Figure 11A:
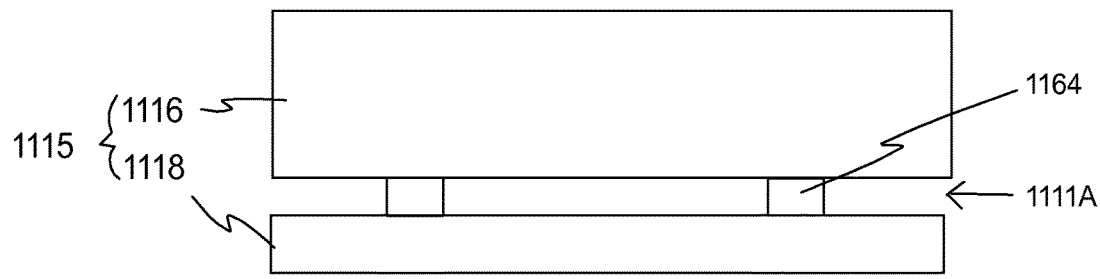
FIG. 11A illustrates another embodiment of a clamp in a clamped configuration.
Figure 11B:
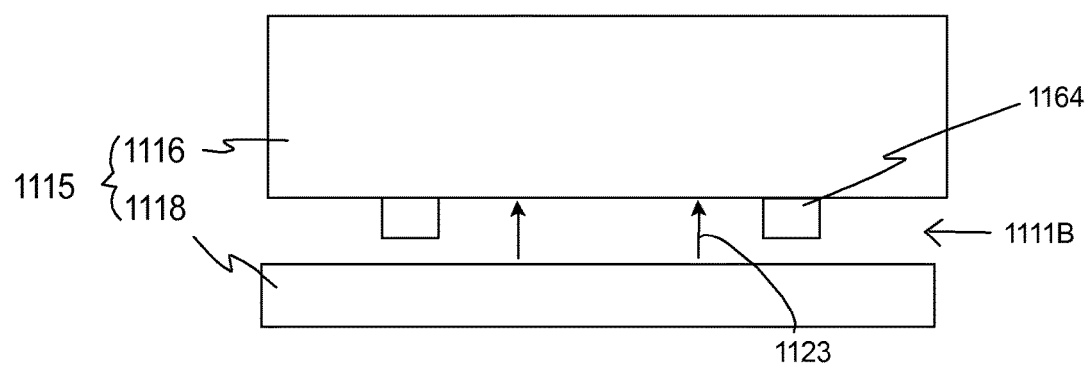
FIG. 11B illustrates the clamp of FIG. 11A in an unclamped configuration.
Figure 11C:
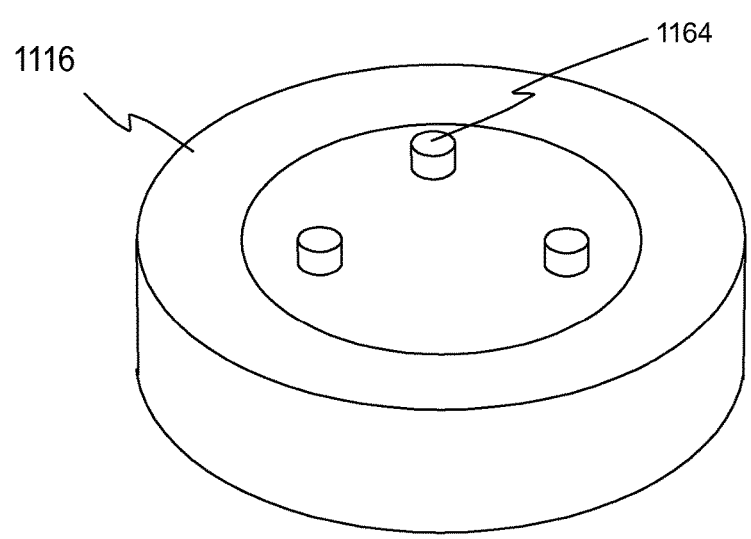
FIG. 11C is a bottom perspective view of a first clamp component of FIG. 11A.

FIG. 11A illustrates another embodiment of a clamp assembly 1115 in the clamped configuration 1111A, FIG. 11B illustrates the clamp assembly 1115 of FIG. 11A in the unclamped configuration 1111B, and FIG. 11C is a bottom perspective view of a first clamp component 1116 of the clamp assembly 1115 of FIG. 11A. In this embodiment, the clamp assembly 1115 is a landable fluid bearing clamp that includes (i) the first clamp component 1116 which is disk shaped and includes a plurality of projections 1164; and (ii) the second clamp component 1118 is also flat disk shaped. In this embodiment, the fluid source directs a fluid from the second clamp component 1118 (and/or the first clamp component 1116) to create the fluid bearing 1123 (illustrated as arrows) that allows for relative movement between the components 1116, 1118. Further, in this embodiment, the landing projections 1164 could be used to make landing more stable in the clamped configuration 1111A.

Figure 12A:
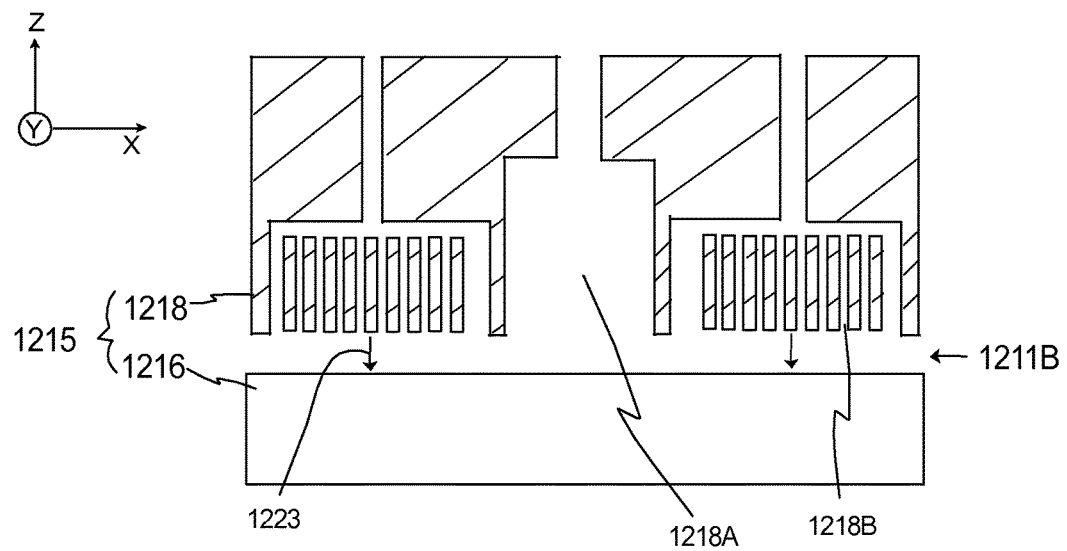
FIG. 12A illustrates yet another embodiment of a clamp in an unclamped configuration.
Figure 12B:
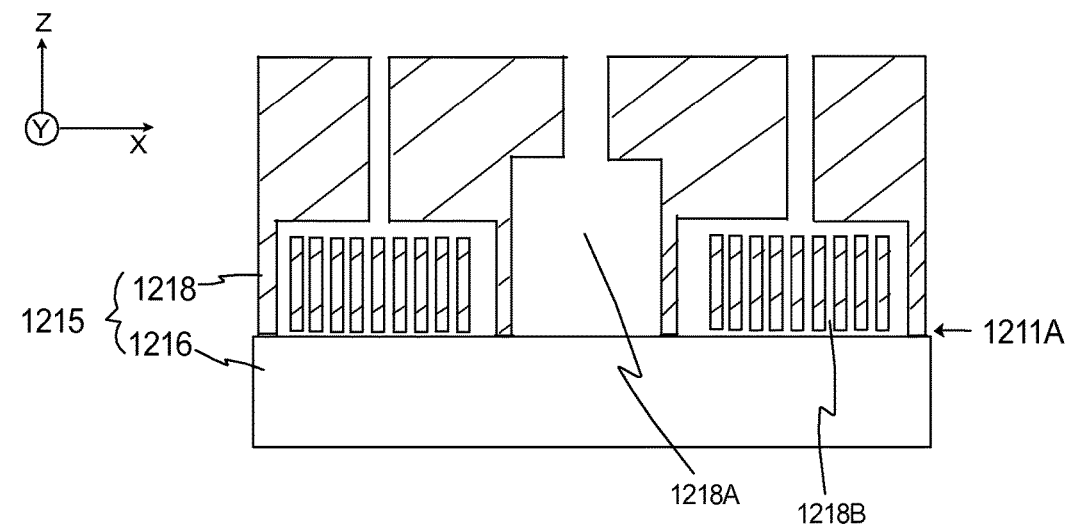
FIG. 12B illustrates the clamp of FIG. 12A in a clamped configuration.

FIG. 12A illustrates a simplified cut-away view of yet another embodiment of a clamp assembly 1215 in an unclamped configuration 1211B, and FIG. 12B illustrates the simplified cut-away view of the clamp assembly 1215 of FIG. 12A in a clamped configuration 1211A. In this embodiment, the clamp assembly 1215 is a landable, vacuum preloaded fluid bearing clamp that includes (i) the first clamp component 1216 which is disk shaped; and (ii) the second clamp component 1218 is also flat disk shaped and defines an disk shaped opening 1218A and a landable fluid bearing surface 1218B (e.g. porous or grooves/projections or combination thereof). In this embodiment, in the unclamped configuration 1211B, the fluid source (not shown) directs a fluid from the bearing surface 1218B of the second clamp component 1218 (and/or from the first clamp component 1216) to create the fluid bearing 1223 that allows for relative movement between the components 1216, 1218. Alternatively, in the clamped configuration 1211A, no fluid is directed from the bearing surface 1218B, but a vacuum is pulled in the opening 1218A to pull the components 1216, 1218 together. When landed, the bearing surface 1218B forms a seal and friction surface for a vacuum chuck. In the clamped configuration 1211A, the vertical force is equal to the atmospheric pressure times the area of the first clamp component 1216 subjected to the vacuum.

It should be noted that the fluid source can pull a vacuum in the opening 1218A in unclamped configuration 1211B to vacuum preload the fluid bearing 1223. Alternatively, the vacuum can be off in the opening 1218A in the unclamped configuration 1211B.

Figure 13A:
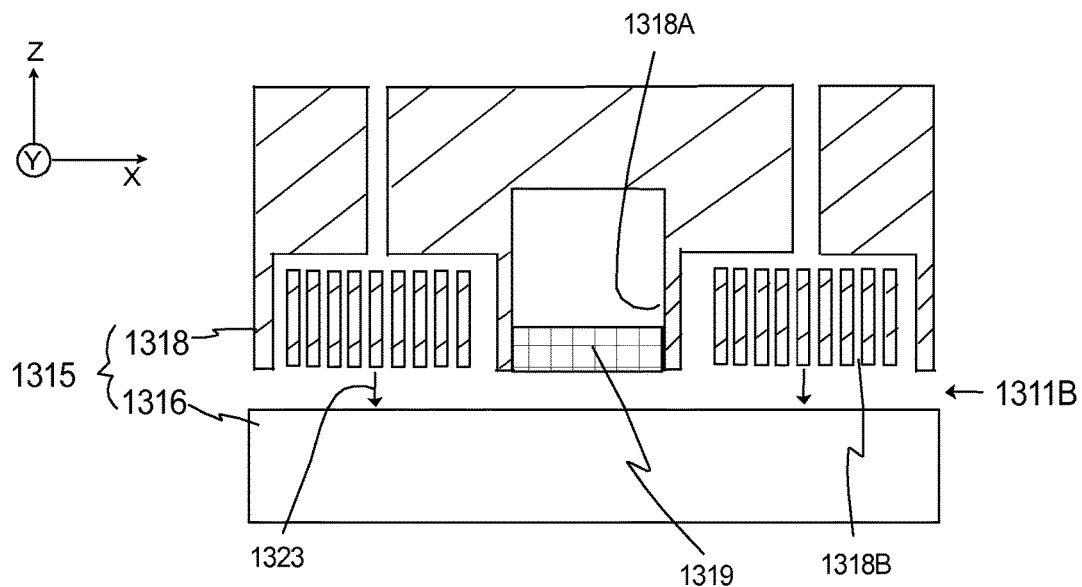
FIG. 13A illustrates still another embodiment of a clamp in an unclamped configuration.
Figure 13B:
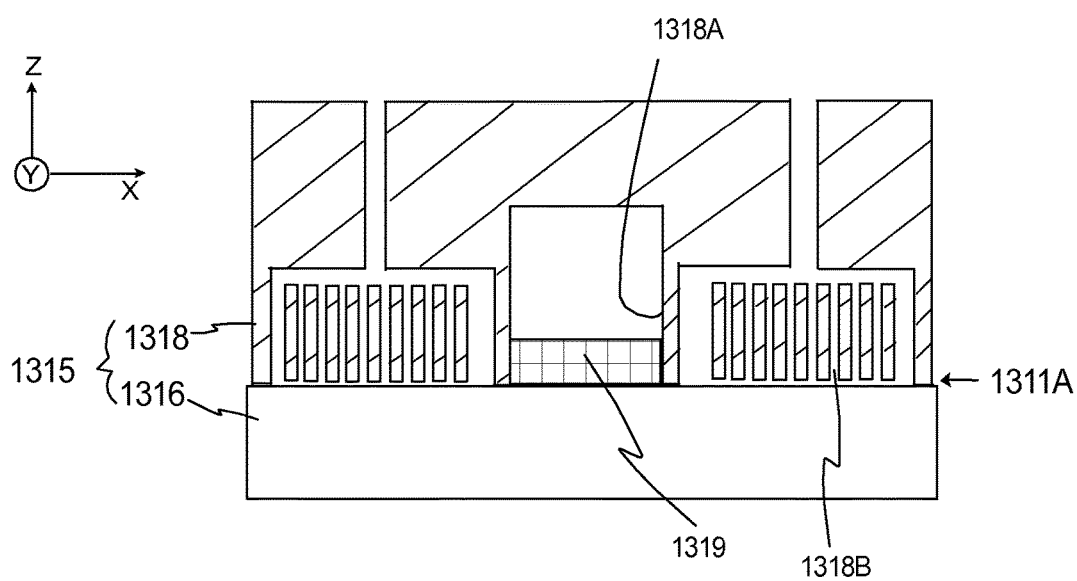
FIG. 13B illustrates the clamp of FIG. 13A in a clamped configuration.

FIG. 13A illustrates a simplified cut-away view of still another embodiment of a clamp assembly 1315 in the unclamped configuration 1311B, and FIG. 13B illustrates the simplified cut-away view of the clamp assembly 1315 of FIG. 13A in the clamped configuration 1311A. In this embodiment, the clamp assembly 1315 again is a landable, electrostatic preloaded fluid bearing clamp that includes (i) the first clamp component 1316 which is disk shaped; and (ii) the second clamp component 1318 is also flat disk shaped and includes a channel 1318A that supports a bias assembly 1319 (e.g. an electrostatic chuck), and a landable fluid bearing surface 1318B (e.g. porous or grooves/projections or combination thereof). In this embodiment, in the unclamped configuration 1311B, the fluid source (not shown) directs a fluid from the bearing surface 1318B of the second clamp component 1318 to create the fluid bearing 1323 that allows for relative movement between the components 1316, 1318. Alternatively, in the clamped configuration 1311A, no fluid is directed (or the pressure is sufficiently reduced) from the bearing surface 1318B, but a voltage is directed to the electrostatic chuck 1319 to pull the components 1316, 1318 together. In this embodiment, the chuck 1319 and the mass of the second clamp component 1318 urge the clamp assembly 1315 to the clamped configuration 1311A.

It should be noted that voltage can be directed to the electrostatic chuck 1319 in unclamped configuration 1311B to preload the fluid bearing 1323. Alternatively, the electrostatic chuck 1319 can be off in the unclamped configuration 1311B.

In this embodiment, the electrostatic chuck 1318A and a dielectric layer could both be on the second clamp component 1318, or the dielectric layer could be on the first clamp component 1316 or both.

Figure 14A:
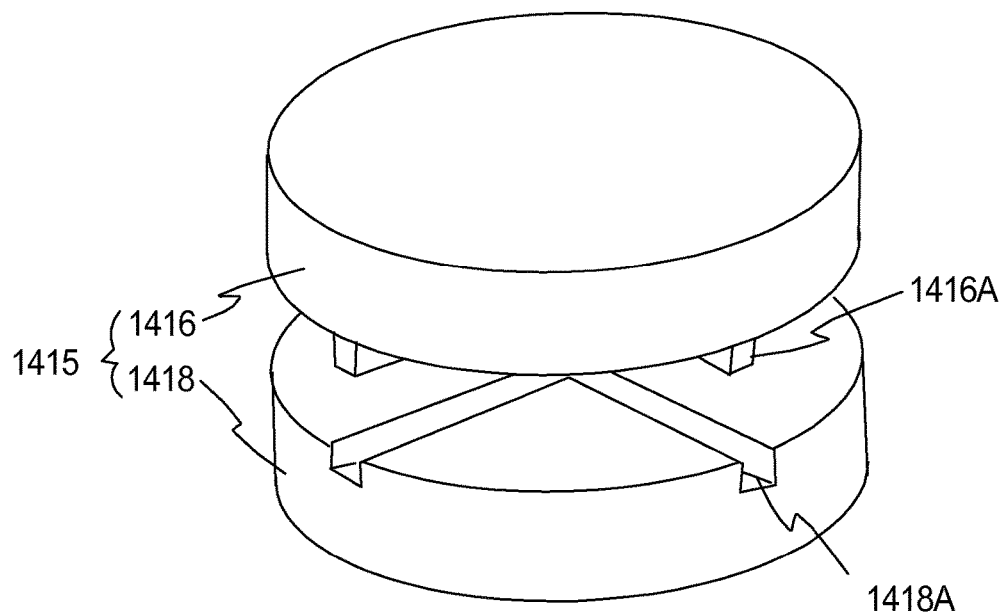
FIG. 14A illustrates still another embodiment of a clamp in an exploded position.
Figure 14B:
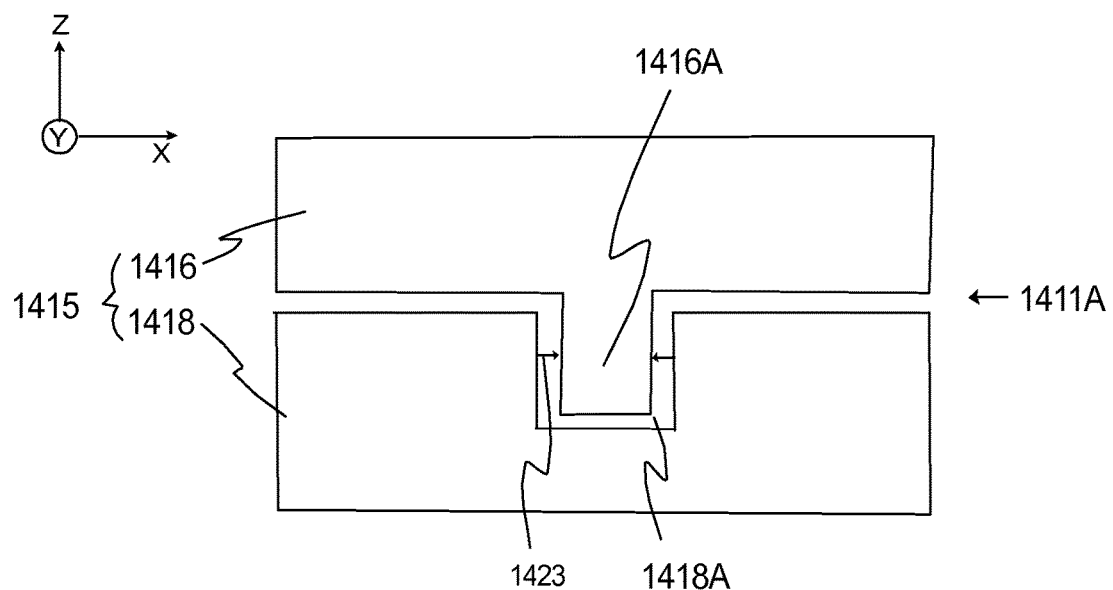
FIG. 14B illustrates the clamp of FIG. 14A in the clamped configuration.

FIG. 14A is a simplified perspective view of still another embodiment of a clamp assembly 1415 in an exploded position and FIG. 14B is a simplified side view of the clamp assembly 1415 of FIG. 14A in the clamped configuration 1411A. In this embodiment, the clamp assembly 1415 includes (i) the first clamp component 1416 which is disk shaped with a plus shaped protrusion 1416A; and (ii) the second clamp component 1418 is also flat disk shaped and defines a corresponding plus shaped groove 1418A that receives the protrusion 1416A. In this embodiment, in the clamped configuration 1411A, the fluid source (not shown) directs a fluid to create the fluid bearing 1423 between the protrusion 1416A and the groove 1418A that provide XY forces in opposite directions. These forces should "center" the protrusion 1416A in the groove 1418A, aligning the structure to the air bearing and clamping. This alignment should inhibit motion in X, Y and theta Z (rotation).

It should be noted that the protrusion 1416A and the groove 1418A can have a different configuration than illustrated in FIGS. 14A and 14B, as long as the shape of protrusion 1416A fits into and corresponds to the shape of the groove 1418A.

Figure 15:
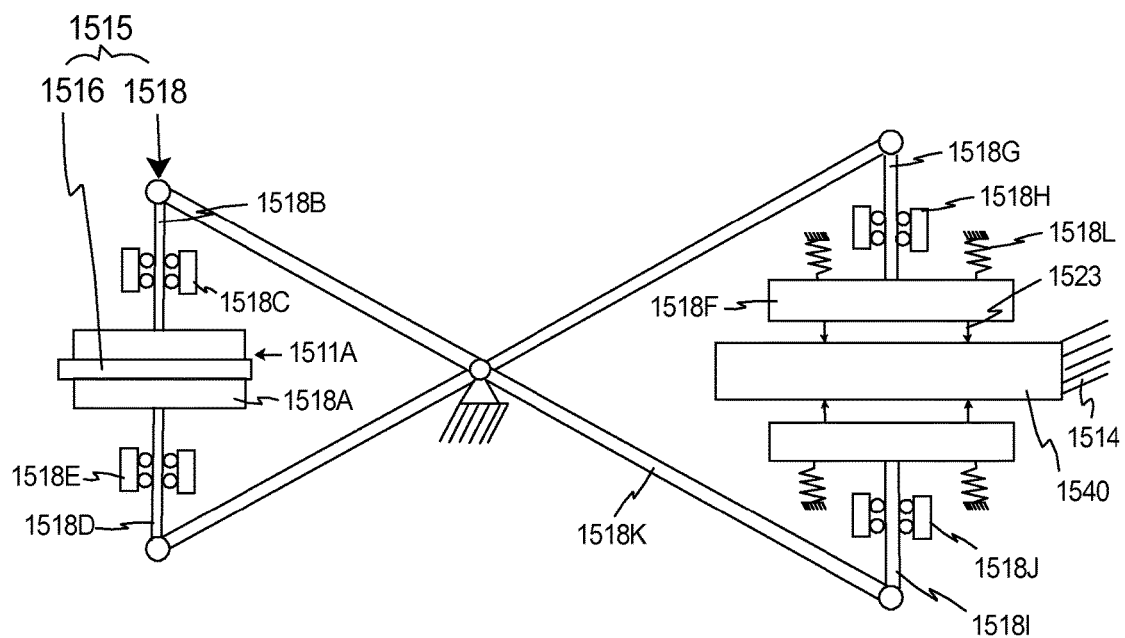
FIG. 15 illustrates another embodiment of a fluid bearing clamp in a clamped configuration.

FIG. 15 illustrates another embodiment of a fluid bearing clamp assembly 1515 in a clamped configuration 1511A. In this embodiment, the clamp assembly 1515 includes (i) the first clamp component 1516 which is flat plate shaped; and (ii) the second clamp component 1518. In this embodiment, the second clamp component 1518 includes (i) a pair of left clamp pads 1518A that are positioned on opposite sides of and adjacent to the first clamp component 1516; (ii) a left upper connector rod 1518B that extends upward from the upper left clamp pad 1518A; (iii) a left upper guide 1518C that guides the movement of the left upper connector rod 1518B; (iv) a left lower connector rod 1518D that extends downward from the lower left clamp pad 1518A; (v) a left lower guide 1518E that guides the movement of the left lower connector rod 1518D; (vii) a pair of right moving members 1518F that are positioned on opposite sides of and adjacent to a wall plate 1540 that is secured to the second object 1514; (viii) a right upper connector rod 1518G that extends upward from the upper right clamp pad 1518F; (ix) a right upper guide 1518H that guides the movement of the left upper connector rod 1518B; (x) a right lower connector rod 1518I that extends downward from the lower right clamp pad 1518F; (xi) a right lower guide 1518J that guides the movement of the right lower connector rod 1518I; (xii) a pair of connector beams 1518K arranged as an X that is pivotably connected to the second object 1514; and (xiii) a bias assembly 1518L that urges the right clamp pads 1518F towards the wall plate 1540. In this embodiment, the connector beams 1518K connect the connector rods 1518B, 1518D, 1518G, 1518I together. The bias assembly 1518L can include springs, a resilient member and/or another type of actuator.

In this embodiment, in the clamped configuration 1511A, fluid is directed from the right clamp pads 1518F at the wall plate 1540 to create two fluid bearings 1523 (arrows) that overcome the bias assembly 1518L and move the moving members 1518F away from the wall plate 1540. This causes the left clamp pads 1518A to be pressed against and clamp the first clamp component 1516.

In contrast, in the unclamped configuration (not shown), no fluid is directed from the right moving members 1518F. As a result thereof, the bias assembly 1518L causes the moving members 1518F to move towards and against the wall plate 1540. This causes the left clamp pads 1518A to move away from and not clamp the first clamp component 1516.

It should be noted that the embodiment illustrated in FIG. 15 can be simplified or changed in a number of ways. The main idea of this embodiment is to use a first fluid bearing 1523 to move one or more moving members 1518F which are mechanically connected to one or more clamp pads 1518A, which clamp the first clamp component 1516. The mechanical connection allows the clamping to occur with a mechanical advantage and over a distance. The type of mechanical connection can vary greatly. In FIG. 15, the components 1518B, 1518C, 1518D, 1518E 1518G, 1518H, 1518I, 1518J make up the mechanical connection. However, someone knowledgeable in the art will see that there are many ways to mechanically connect the two (or more or less) moving members 1518F to the clamp pads 1518A.

Figure 16A:
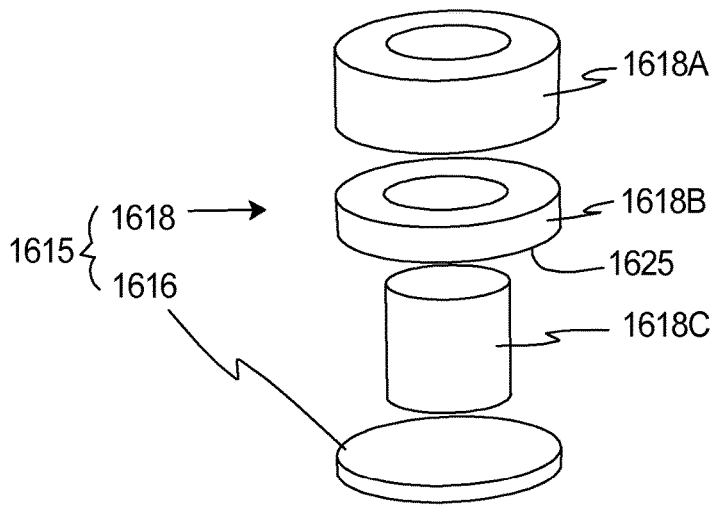
FIG. 16A is an exploded perspective view of yet another embodiment of a clamp assembly.
Figure 16B:
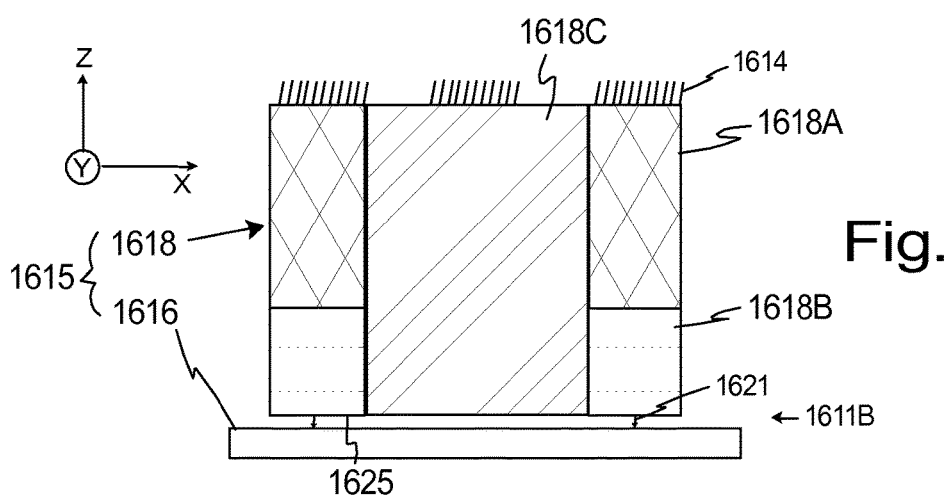
FIG. 16B is a simplified cut-away view of the clamp assembly of FIG. 16A in the unclamped configuration.
Figure 16C:
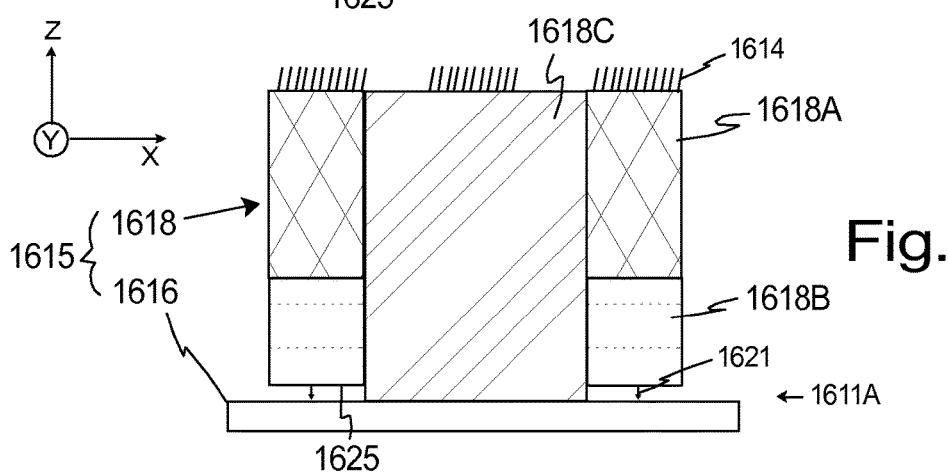
FIG. 16C is a simplified cut-away view of the clamp assembly of FIG. 16A in the clamped configuration.

FIG. 16A is an exploded perspective view of yet another embodiment of a clamp assembly 1615, FIG. 16B is a simplified cut-away view of the clamp assembly 1615 of FIG. 16A in the unclamped configuration 1611B; and FIG. 16C is a simplified cut-away view of the clamp assembly 1615 of FIG. 16A in the clamped configuration 1611A.

In this embodiment, the first clamp component 1616 is generally disk shaped and made of a magnetic material (such as a steel); and the second clamp component 1618 includes (i) a tubular shaped actuator 1618A (e.g. a piezoelectric actuator), (ii) a tubular shaped bearing structure 1618B positioned below, secured to, and aligned with the actuator 1618A that includes a fluid bearing surface 1625, and (iii) a cylindrical shaped magnet 1618C that fits within the actuator 1618A and the fluid bearing 1618. In this embodiment, the actuator 1618A and the magnet 1618C are fixedly secured to the second object 1614. In this embodiment, the fluid source (not shown) directs the fluid from fluid bearing surface 1625 of the bearing structure 1618B to create a fluid bearing 1621 between the bearing structure 1618B and the first clamp component 1616.

During operation, the fluid bearing 1621 floats the first clamp component 1616 a predetermined distance (e.g. ten microns) away from the magnet 1618C contained within the annulus of the bearing structure 1618B. Further, the actuator 1618A sets the position of the bearing structure 1618B. When clamping is desired, the actuator 1618A is retracted to retract the bearing structure 1618B. The fluid bearing 1621 with maintain the same predetermined distance between the bearing structure 1618B and the first clamp component 1616. However, the gap between the first clamp component 1616 and the magnet 1618C decreases until contact (clamping) is achieved as illustrated in FIG. 16C.

Alternatively, in the unclamped configuration 1611B illustrated in FIG. 16B, the actuator 1618A is extended to extend the bearing structure 1618B. The fluid bearing 1621 will maintain the same predetermined distance between the bearing structure 1618B and the first clamp component 1616. However, the gap between the first clamp component 1616 and the magnet 1618C will increase and the magnet 1618C will not contact the first clamp component 1616. This will allow the first clamp component 1616 to move with three degrees of freedom relative to the second clamp component 1618.

In this embodiment, the fluid bearing 1621 has the same fly height in the clamped configuration 1611A and the unclamped configuration 1611B. This allows the bearing stiffness to be maximized by optimizing the bearing for a specific fly height. It also simplifies the control system, since the fluid bearing pressure does not have to be modulated (controlled).

Optionally, one of the positions of the actuator 1618A can be the default relaxed position of the actuator, and this position requires no power to hold the position.

It should be noted that other types of actuators can be used instead of a piezoelectric actuator.

Additionally, it should be noted that (i) the surface of the magnet 1618C that faces the first clamp component 1616 can include a plurality of grooves; (ii) the surface of the first clamp component 1616 that faces the magnet 1618C can include a plurality of grooves; (iii) the center of the magnet 1618C can include an opening to inhibit pressure from accumulating in the center; and/or (iv) the center of the first clamp component 1016 can include an opening to inhibit pressure from accumulating in the center.

In yet another, non-exclusive variation of the embodiment illustrated in FIGS. 16A-16C, the single actuator 1618A can be replaced with multiple circumferencially placed actuators, (e.g. three) to achieve theta X and theta Y control, in addition to control along the Z axis of the bearing structure 1618B. This might be desirable to achieve desirable clamp landing trajectories.

It is understood that although a number of different embodiments have been illustrated and described herein, one or more features of any one embodiment can be combined with one or more features of one or more of the other embodiments, provided that such combination satisfies the intent of the present invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A clamp for selectively inhibiting relative movement between a first object and a second object, the clamp comprising:
    a clamp assembly including (i) a first clamp component that is coupled to the first object, the first clamp component having a first planar surface, and (ii) a second clamp component that is coupled to the second object, the second clamp component having a second planar surface, the clamp assembly being movable between a clamped configuration in which relative movement of the clamp components is inhibited and an unclamped configuration that allows for relative movement between the clamp components, the first clamp component being positioned directly against the second clamp component, such that the first planar surface is directly against the second planar surface, when the clamp assembly is in the clamped configuration;
    a bias assembly that urges the first clamp component to move towards the second clamp component and urges the clamp assembly to move from the unclamped configuration to the clamped configuration, the bias assembly being spaced apart from second clamp component when the clamp assembly is in the clamped configuration; and
    a fluid source that selectively directs a fluid to the clamp assembly to selectively generate a fluid bearing between the first clamp component and the second clamp component that urges the clamp assembly from the clamped configuration to the unclamped configuration; wherein the fluid bearing generated by the fluid source opposes the bias assembly and moves the first clamp component to be spaced apart a gap from the second clamp component in the unclamped configuration; wherein the fluid bearing guides relative movement between the clamp components in either direction along a movement axis when the first clamp component is spaced apart from the second clamp component while inhibiting relative movement between the clamp components along a transverse axis that is transverse to the movement axis; and wherein when the fluid source is not generating the fluid bearing, the bias assembly urges the first clamp component against the second clamp component.

2. The clamp of claim 1 wherein the bias assembly includes at least one resilient member.

3. The clamp of claim 1 wherein the first clamp component is passively biased to move toward the second clamp component to urge the clamp assembly from the unclamped configuration toward the clamped configuration.

4. The clamp of claim 1 wherein at least one of the first planar surface and the second planar surface includes at least one surface feature that inhibits an air hammer effect.

5. The clamp of claim 1 wherein the fluid source reduces pressure of the fluid to the clamp assembly so that the clamp assembly moves from the unclamped configuration to the clamped configuration.

6. The clamp of claim 1 wherein the fluid bearing separates the clamp components.

7. The clamp of claim 1 wherein forces and stresses on the first clamp component between the clamped configuration and the unclamped configuration change by less than approximately three percent.

8. The clamp of claim 1 wherein clamping loads are substantially symmetrical and substantially perpendicular to an axis being clamped.

9. A clamp for selectively inhibiting relative movement between a first object and a second object, the clamp comprising:
a clamp assembly including a first clamp component that is coupled to the first object, and a second clamp component that is coupled to the second object, the clamp assembly being movable between a clamped configuration in which relative movement of the clamp components is inhibited and an unclamped configuration that allows for relative movement between the clamp components;
a bias assembly that urges the first clamp component to move towards the second clamp component and urges the clamp assembly to move from the unclamped configuration to the clamped configuration;
a fluid source that selectively directs a fluid to the clamp assembly to selectively generate a fluid bearing between the first clamp component and the second clamp component that urges the clamp assembly from the clamped configuration to the unclamped configuration; wherein the fluid bearing generated by the fluid source opposes the bias assembly and moves the first clamp component to be spaced apart a gap from the second clamp component in the unclamped configuration; wherein the fluid bearing guides relative movement between the clamp components in either direction along a movement axis when the first clamp component is spaced apart from the second clamp component while inhibiting relative movement between the clamp components along a transverse axis that is transverse to the movement axis; and wherein when the fluid source is not generating the fluid bearing, the bias assembly urges the first clamp component against the second clamp component; and
an electrostatic chuck that increases a clamping force between the clamping components in the clamped configuration.

10. The clamp of claim 1 further comprising a vacuum chuck that increases a clamping force between the clamping components in the clamped configuration.

11. The clamp of claim 1 further comprising a clamping fluid bearing that increases a clamping force between the clamping components in the clamped configuration.

12. The clamp of claim 1 wherein the second clamp component includes a fluid bearing surface that is used to create the fluid bearing, and wherein the clamp includes an actuator that moves the fluid bearing surface to move the clamp between the clamped configuration and the unclamped configuration.

13. The clamp of claim 1 wherein the first clamp component includes a projection and the second clamp component includes a groove that receives the projection, and wherein a fluid bearing is created between the projection and the groove to inhibit relative movement.

14. The clamp of claim 1 further comprising a retractable plate to increase a clamping force between the clamping components in the clamped configuration.

15. The clamp of claim 1 wherein the second clamp component includes a mechanical connection that causes clamping to occur with a mechanical advantage.

16. A clamp for selectively inhibiting relative movement between a first object and a second object, the clamp comprising:
a clamp assembly including a first clamp component that is coupled to the first object, and a second clamp component that is coupled to the second object, the clamp assembly being movable between a clamped configuration in which relative movement of the clamp components is inhibited and an unclamped configuration that allows for relative movement between the clamp components;
a fluid source that selectively directs a fluid to the clamp assembly to selectively generate a fluid bearing between the first clamp component and the second clamp component that urges the clamp assembly from the clamped configuration to the unclamped configuration; and
a bias assembly that urges the first clamp component to move towards the second clamp component and urges the clamp assembly to move from the unclamped configuration to the clamped configuration, wherein the bias assembly includes a magnet.

17. An assembly comprising:
a first object;
a second object; and
a clamp assembly that is selectively movable between a clamped configuration and an unclamped configuration for selectively inhibiting relative movement between the first object and the second object along a movement axis, the clamp assembly including (i) a cylindrical shaft-shaped first clamp component that is coupled to the first object, the first clamp component having an outer diameter, (ii) an annular tube-shaped second clamp component that is coupled to the second object, the second clamp component having an inner diameter, wherein at least one of the clamp components is radially deformed when the first clamp component is positioned inside the second clamp component, and wherein the inner diameter of the second clamp component is smaller than the outer diameter of the first clamp component along a full length of the second clamp component when the first clamp component is not positioned inside the second clamp component, and (iii) a fluid source that selectively directs a fluid between the clamp components to move the clamp assembly from the clamped configuration in which first clamp component is positioned within and directly engages the second clamp component and inhibits relative movement of the clamp components and the objects along the movement axis, and the unclamped configuration in which a fluid bearing is created between the clamp components and the at least one of the clamp components is radially deformed so that the clamp components are spaced apart a gap from one another; wherein the fluid bearing guides relative movement between the clamp components in either direction along the movement axis when the first clamp component is spaced apart from the second clamp component while inhibiting relative movement between the clamp components along a transverse axis that is transverse to the movement axis, wherein clamping loads in the clamped configuration are symmetrical and perpendicular to the movement axis; wherein when the fluid source is turned off, the outer diameter of the first clamp component contacts the inner diameter of the second clamp component, and the friction resulting from this contact holds the first clamping component in place relative to the second clamp component; and wherein when the fluid source is turned on, the outer diameter of the first clamp component does not contact the inner diameter of the second clamp component, and the fluid bearing allows smooth stiction free motion of the first clamp component along the movement axis.

18. The assembly of claim 17 wherein the first clamp component is radially deformed when the first clamp component is positioned within the second clamp component.

19. The assembly of claim 18 wherein the first clamp component includes a plurality of deformable sections each having an S-shaped cross-section.

20. The assembly of claim 18 wherein the first clamp component is biased to move to the clamped configuration.

21. The assembly of claim 18 wherein the first clamp component includes at least one deformable section having an S-shaped cross-section.

22. The assembly of claim 17 wherein forces and stresses on the first clamp component between the clamped configuration and the unclamped configuration change by less than approximately three percent.

23. An assembly comprising:
a first object;
a second object; and
a clamp assembly that is selectively movable between a clamped configuration and an unclamped configuration for selectively inhibiting relative movement between the first object and the second object along a movement axis, the clamp assembly including (i) a cylindrical shaft-shaped first clamp component that is coupled to the first object, (ii) an annular tube-shaped second clamp component that is coupled to the second object, wherein at least one of the clamp components includes a plurality of spaced apart deformable sections that are compliant such that the at least one of the clamp components is radially deformed when the first clamp component is positioned inside the second clamp component, and (iii) a fluid source that selectively directs a fluid between the clamp components to move the clamp assembly from the clamped configuration in which first clamp component is positioned within and directly engages the second clamp component and inhibits relative movement of the clamp components and the objects along the movement axis, and the unclamped configuration in which a fluid bearing is created between the clamp components and the at least one of the clamp components is radially deformed so that the clamp components are spaced apart a gap from one another; wherein the fluid bearing guides relative movement between the clamp components in either direction along the movement axis when the first clamp component is spaced apart from the second clamp component while inhibiting relative movement between the clamp components along a transverse axis that is transverse to the movement axis; wherein clamping loads in the clamped configuration are symmetrical and perpendicular to the movement axis; wherein when the fluid source is turned off, the outer diameter of the first clamp component contacts the inner diameter of the second clamp component, and the friction resulting from this contact holds the first clamping component in place relative to the second clamp component; and wherein when the fluid source is turned on, the outer diameter of the first clamp component does not contact the inner diameter of the second clamp component, and the fluid bearing allows smooth stiction free motion of the first clamp component along the movement axis.

24. The assembly of claim 23 wherein the first clamp component includes the plurality of spaced apart deformable sections that are compliant such that the first clamp component is radially deformed when the first clamp component is positioned within the second clamp component.

25. The assembly of claim 24 wherein each of the plurality of spaced apart deformable sections of the first clamp component have an S-shaped cross-section.

26. The assembly of claim 24 wherein the first clamp component is biased to move to the clamped configuration.

27. The assembly of claim 23 wherein the first clamp component has an outer diameter, wherein the second clamp component has an inner diameter, and wherein the inner diameter of the second clamp component is smaller than the outer diameter of the first clamp component along a full length of the second clamp component when the first clamp component is not positioned inside the second clamp component.

* * * * *